United States Patent
Ozzie et al.

(10) Patent No.: US 9,747,266 B2
(45) Date of Patent: *Aug. 29, 2017

(54) CLIPBOARD AUGMENTATION WITH REFERENCES

(75) Inventors: Raymond E. Ozzie, Seattle, WA (US); Jack E. Ozzie, North Bend, WA (US); Paresh S. Suthar, Redmond, WA (US); Raman Narayanan, Kirkland, WA (US); Matthew S. Augustine, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 277 days.

This patent is subject to a terminal disclaimer.

(21) Appl. No.: 13/017,727

(22) Filed: Jan. 31, 2011

(65) Prior Publication Data

US 2011/0126093 A1 May 26, 2011

Related U.S. Application Data

(63) Continuation of application No. 11/621,423, filed on Jan. 9, 2007, which is a continuation-in-part of application No. 11/557,004, filed on Nov. 6, 2006, now Pat. No. 8,020,112.

(51) Int. Cl.
*G06F 17/24* (2006.01)
*G06F 9/54* (2006.01)
*G06F 17/22* (2006.01)

(52) U.S. Cl.
CPC .............. *G06F 17/24* (2013.01); *G06F 9/543* (2013.01); *G06F 17/2235* (2013.01)

(58) Field of Classification Search
CPC .................. G06F 17/211; G06F 17/30011
See application file for complete search history.

(56) References Cited

U.S. PATENT DOCUMENTS

| | | |
|---|---|---|
| 5,261,080 A | 11/1993 | Khoyi et al. |
| 5,392,386 A | 2/1995 | Chalas |
| 5,442,742 A | 8/1995 | Greyson et al. |

(Continued)

FOREIGN PATENT DOCUMENTS

| | | |
|---|---|---|
| EP | 597575 B1 | 12/1999 |
| WO | 0073902 A1 | 12/2000 |
| WO | 03030475 A2 | 4/2003 |

OTHER PUBLICATIONS

"Non-Final Office Action Issued in U.S. Appl. No. 13/897,889", Mailed Date: Jul. 28, 2016, 18 Pages.

(Continued)

*Primary Examiner* — Ryan Barrett
*Assistant Examiner* — Haimei Jiang
(74) *Attorney, Agent, or Firm* — Singh Law, PLLC; Ranjeev Singh

(57) ABSTRACT

Systems, methods, data structures and/or the like are provided for placing copy data, supplemental, and/or additional data on a clipboard, for example. The copy data may comprise a reference to supplemental data, such as HTML data (e.g., a social media data from an HTML social media webpage). The supplemental data may be retrieved using the reference, and placed within the clipboard. In this way, the copy data and the supplemental data may be available within the clipboard.

20 Claims, 5 Drawing Sheets

(56) References Cited

U.S. PATENT DOCUMENTS

| | | |
|---|---|---|
| 5,579,521 A | 11/1996 | Shearer et al. |
| 5,625,809 A | 4/1997 | Dysart et al. |
| 5,752,254 A | 5/1998 | Sakairi |
| 5,781,192 A | 7/1998 | Kodimer |
| 5,781,908 A | 7/1998 | Williams et al. |
| 5,899,996 A | 5/1999 | Dysart et al. |
| 5,924,099 A | 7/1999 | Guzak et al. |
| 5,926,633 A | 7/1999 | Takagi et al. |
| 5,964,834 A | 10/1999 | Crutcher |
| 5,974,238 A | 10/1999 | Chase, Jr. |
| 6,091,731 A | 7/2000 | Biegaj et al. |
| 6,202,100 B1 | 3/2001 | Maltby et al. |
| 6,295,541 B1 | 9/2001 | Bodnar et al. |
| 6,309,305 B1 | 10/2001 | Kraft |
| 6,338,084 B1 | 1/2002 | Rankin et al. |
| 6,401,104 B1 | 6/2002 | LaRue et al. |
| 6,460,089 B1 | 10/2002 | Romano et al. |
| 6,490,634 B2 | 12/2002 | Coiner |
| 6,532,474 B2 | 3/2003 | Iwamoto et al. |
| 6,549,922 B1 | 4/2003 | Srivastava et al. |
| 6,553,037 B1 | 4/2003 | Pivowar et al. |
| 6,591,295 B1 | 7/2003 | Diamond et al. |
| 6,675,213 B1 | 1/2004 | Schmonsees |
| 6,721,951 B1 | 4/2004 | Williams et al. |
| 6,724,403 B1 | 4/2004 | Santoro et al. |
| 6,760,728 B1 | 7/2004 | Osborn |
| 6,781,192 B2 | 8/2004 | Farrar |
| 6,912,690 B2 | 6/2005 | Bauchot |
| 6,983,328 B2 | 1/2006 | Beged-Dov et al. |
| 6,986,105 B2 | 1/2006 | Walker, Jr. |
| 6,993,522 B2 | 1/2006 | Chen et al. |
| 7,003,546 B1 | 2/2006 | Cheah |
| 7,007,041 B2 | 2/2006 | Multer et al. |
| 7,013,316 B1 | 3/2006 | Hansen et al. |
| 7,130,924 B2 | 10/2006 | Bartlett et al. |
| 7,146,571 B2 | 12/2006 | Bates et al. |
| 7,207,008 B1 | 4/2007 | Koch |
| 7,260,610 B2 | 8/2007 | Grooters et al. |
| 7,421,155 B2 | 9/2008 | King et al. |
| 7,496,230 B2 | 2/2009 | Chen et al. |
| 7,640,184 B1 | 12/2009 | Lunt |
| 7,725,456 B2 | 5/2010 | Augustine |
| 7,774,753 B1 | 8/2010 | Reilly et al. |
| 7,933,296 B2 | 4/2011 | Augustine et al. |
| 7,950,066 B1 | 5/2011 | Zuili |
| 8,020,112 B2 | 9/2011 | Ozzie et al. |
| 2002/0007380 A1 | 1/2002 | Bauchot et al. |
| 2002/0073204 A1 | 6/2002 | Dutta et al. |
| 2002/0122054 A1 | 9/2002 | Hind et al. |
| 2002/0133508 A1 | 9/2002 | LaRue et al. |
| 2002/0138653 A1 | 9/2002 | Ogura |
| 2002/0143997 A1 | 10/2002 | Huang et al. |
| 2003/0009602 A1 | 1/2003 | Jacobs et al. |
| 2003/0105831 A1 | 6/2003 | O'Kane |
| 2003/0115301 A1 | 6/2003 | Koskimies et al. |
| 2003/0142134 A1 | 7/2003 | Bates et al. |
| 2003/0149708 A1 | 8/2003 | Tsao |
| 2003/0220966 A1 | 11/2003 | Hepper et al. |
| 2004/0019614 A1 | 1/2004 | Wang |
| 2004/0100496 A1 | 5/2004 | Creasor et al. |
| 2004/0103167 A1 | 5/2004 | Grooters et al. |
| 2004/0122809 A1* | 6/2004 | Clark .............. G06F 17/30637 |
| 2004/0148375 A1 | 7/2004 | Levett et al. |
| 2004/0153974 A1 | 8/2004 | Walker, Jr. |
| 2004/0172423 A1 | 9/2004 | Kaasten et al. |
| 2004/0172584 A1* | 9/2004 | Jones .................. G06F 9/543 715/213 |
| 2004/0205470 A1 | 10/2004 | Jones et al. |
| 2004/0210846 A1* | 10/2004 | Olsen .................. H04L 29/06 715/761 |
| 2004/0226012 A1 | 11/2004 | Awada et al. |
| 2004/0250215 A1 | 12/2004 | Chen et al. |
| 2005/0038811 A1 | 2/2005 | Pivowar et al. |
| 2005/0050054 A1 | 3/2005 | Clark et al. |
| 2005/0066335 A1* | 3/2005 | Aarts .................. G06F 9/543 719/316 |
| 2005/0091603 A1 | 4/2005 | Chen et al. |
| 2005/0093868 A1* | 5/2005 | Hinckley ............ G06F 3/011 345/502 |
| 2005/0102629 A1 | 5/2005 | Chen et al. |
| 2005/0117606 A1 | 6/2005 | Kim |
| 2005/0138122 A1 | 6/2005 | Boehringer et al. |
| 2005/0154993 A1* | 7/2005 | Chen .................. G06F 17/211 715/770 |
| 2005/0154994 A1 | 7/2005 | Chen et al. |
| 2005/0155017 A1 | 7/2005 | Berstis et al. |
| 2005/0165615 A1 | 7/2005 | Minar |
| 2005/0172241 A1 | 8/2005 | Daniels et al. |
| 2005/0172296 A1 | 8/2005 | Schleifer et al. |
| 2005/0182792 A1 | 8/2005 | Israel et al. |
| 2005/0198299 A1 | 9/2005 | Beck et al. |
| 2005/0203905 A1 | 9/2005 | Jung et al. |
| 2005/0203935 A1 | 9/2005 | McArdle |
| 2005/0256907 A1 | 11/2005 | Novik et al. |
| 2005/0262521 A1 | 11/2005 | Kesavarapu |
| 2005/0289265 A1 | 12/2005 | Illowsky et al. |
| 2006/0004600 A1 | 1/2006 | Summer et al. |
| 2006/0010204 A1 | 1/2006 | Jalava et al. |
| 2006/0028396 A1 | 2/2006 | Starbuck et al. |
| 2006/0041589 A1 | 2/2006 | Helfman et al. |
| 2006/0041893 A1 | 2/2006 | Castro et al. |
| 2006/0066335 A1 | 3/2006 | Kang et al. |
| 2006/0074996 A1 | 4/2006 | Corbett et al. |
| 2006/0095507 A1 | 5/2006 | Watson |
| 2006/0106879 A1 | 5/2006 | Zondervan et al. |
| 2006/0123010 A1 | 6/2006 | Landry et al. |
| 2006/0129907 A1 | 6/2006 | Volk et al. |
| 2006/0129917 A1 | 6/2006 | Volk et al. |
| 2006/0143459 A1 | 6/2006 | Villaron et al. |
| 2006/0150004 A1 | 7/2006 | Mizutani |
| 2006/0155821 A1 | 7/2006 | Pichetti et al. |
| 2006/0184617 A1 | 8/2006 | Nicholas et al. |
| 2006/0190835 A1 | 8/2006 | Cunningham et al. |
| 2006/0206807 A1 | 9/2006 | Rosner et al. |
| 2006/0212792 A1 | 9/2006 | White et al. |
| 2006/0215215 A1 | 9/2006 | Kumaran |
| 2006/0217126 A1 | 9/2006 | Sohm et al. |
| 2006/0218224 A1 | 9/2006 | Agrawal et al. |
| 2006/0218492 A1 | 9/2006 | Andrade |
| 2006/0225137 A1 | 10/2006 | Odins-Lucas et al. |
| 2006/0230021 A1 | 10/2006 | Diab et al. |
| 2006/0230345 A1 | 10/2006 | Weng et al. |
| 2006/0242327 A1 | 10/2006 | Knight et al. |
| 2006/0242549 A1 | 10/2006 | Schwier et al. |
| 2006/0247961 A1 | 11/2006 | Klemow |
| 2006/0253489 A1 | 11/2006 | Kahn et al. |
| 2006/0265396 A1 | 11/2006 | Raman et al. |
| 2006/0265409 A1 | 11/2006 | Neumann et al. |
| 2006/0265518 A1 | 11/2006 | Owens et al. |
| 2006/0282822 A1 | 12/2006 | Weng |
| 2006/0288053 A1 | 12/2006 | Holt et al. |
| 2006/0288329 A1 | 12/2006 | Gandhi et al. |
| 2007/0022174 A1 | 1/2007 | Issa |
| 2007/0038712 A1 | 2/2007 | Affronti et al. |
| 2007/0061752 A1* | 3/2007 | Cory .................. G06F 9/543 715/804 |
| 2007/0100959 A1 | 5/2007 | Eichstaedt et al. |
| 2007/0100960 A1 | 5/2007 | Eichstaedt et al. |
| 2007/0106952 A1 | 5/2007 | Matas et al. |
| 2007/0112880 A1 | 5/2007 | Yang et al. |
| 2007/0136443 A1 | 6/2007 | Sah et al. |
| 2007/0162517 A1 | 7/2007 | Teegan et al. |
| 2007/0168461 A1 | 7/2007 | Moore |
| 2007/0179989 A1* | 8/2007 | Maes .................. H04L 67/1095 |
| 2007/0204308 A1 | 8/2007 | Nicholas et al. |
| 2007/0250520 A1 | 10/2007 | Dettinger et al. |
| 2007/0276836 A1 | 11/2007 | Chatterjee et al. |
| 2007/0294366 A1 | 12/2007 | Ozzie et al. |
| 2007/0299880 A1 | 12/2007 | Kawabe et al. |
| 2008/0005081 A1* | 1/2008 | Green .............. G06F 17/30038 |
| 2008/0028442 A1 | 1/2008 | Kaza et al. |
| 2008/0046471 A1 | 2/2008 | Moore et al. |
| 2008/0108744 A1 | 5/2008 | Ishige et al. |

(56) References Cited

U.S. PATENT DOCUMENTS

| | | | |
|---|---|---|---|
| 2008/0109464 A1 | 5/2008 | Ozzie et al. | |
| 2008/0109744 A1 | 5/2008 | Ozzie et al. | |
| 2008/0109832 A1 | 5/2008 | Ozzie et al. | |
| 2008/0115046 A1* | 5/2008 | Yamaguchi | G06F 17/214 715/201 |
| 2008/0126364 A1 | 5/2008 | Khosravy et al. | |
| 2008/0141136 A1 | 6/2008 | Ozzie et al. | |
| 2008/0144669 A1 | 6/2008 | Lee et al. | |
| 2008/0155112 A1 | 6/2008 | Ma et al. | |
| 2008/0195739 A1 | 8/2008 | Ozzie et al. | |
| 2008/0243874 A1 | 10/2008 | Suthar et al. | |
| 2008/0267221 A1 | 10/2008 | Ozzie et al. | |

OTHER PUBLICATIONS

"Attensa Feed Server-Secure,Scalable Web Feed Server," Retrieved From <<https://web.archive.org/web/20061225175752/http://www.attensa.com/products/server>>, Dec. 14, 2006, 1 Page.

"Clipboard", Retrieved From <<https://msdn.microsoft.com/en-us/library/ms648709(printer).aspx>>, Retrieved on: Jul. 4, 2008, 5 Pages.

"Clipboard copy/paste detection", Retrieved From <<http://forums.codeguru.com/showthread.php?3439T7-Clipboard-copy-paste-detection>>, 17 Pages.

"Clipboard: Adding Other Formats", Retrieved From <<https://msdn.microsoft.com/en-us/library/838a3whf.aspx>>, Retrieved on: Nov. 16, 2006, 1 Page.

"Copy Structured Data between Web Sites through RSS: Ray's Live Clipboard is Next", Retrieved From <<http://www.masternewmedia.org/news/2006/03/31/copy_structured_data_between_web.htm, Mar. 31, 2006, 7 Pages.

"Ektron CMS200", Retrieved From <<https://web.archive.org/web/20061210124649/http://ektron.com/manuals/datasheets/EktronCMS200-datasheet.pdf>>, Retrieved on: Dec. 14, 2006, 1 Page.

"Enterprise RSS the Center of Attention", Retrieved From <<http://attensa.typepad.com/attensa/files/attensa_enterprise_rss_whitepaper_0605.pdf>>, May 2006, 11 Pages.

"eZine Approach Understanding OLE", Retrieved From <<http://www.glencoe.com/ps/computered/pas/artide.php4?articleld=149>>, 2001, 3 Pages.

"Frequently Asked Questions for Simple Sharing Extensions (SSE)", Retrieved From <<https://web.archive.org/web/20060825042020/http://msdn.microsoft.com/xml/rss/ssefaq/>>, 3 Pages.

"Google Data API's (Beta) Developers Guide: Google Data API's Overview", Retrieved From <<https://web.archive.org/web/20091006200722/http://code.google.com/apis/gdata/overview.html>>, Apr. 5, 2007, 1 Page.

"Live Clipboard", Retrieved From <<http://spaces.live.com/editorial/rayozzie/demo/liveclip/specification/v092.html>>, Dec. 14, 2006, Apr. 21, 2006, 15 Pages.

"Live Clipboard Example", Retrieved From <<https://web.archive.org/web/20061211200552/http://spaces.live.com/editorial/rayozzie/demo/liveclip/liveclipsample/clipboardexample.html>>, Retrieved on: Jul. 3, 2008, 2 Pages.

"Live Clipboard Screencasts", Retrieved From <<http://spaces.live.com/editorial/rayozzie/demo/liveclip/screencast/livedipdemo.html>>, Dec. 14, 2006, Retrieved on: Jul. 7, 2008, 1 Page.

"Live Clipboard Technical Introduction", Retrieved From <<http://spaces.live.com/editorial/rayozzie/demo/liveclip/liveclipsample/techPreview.html>>, Nov. 2, 2006, 4 Pages.

"Live Clipboard—Wiring the Web", Retrieved From <<https://web.archive.org/web/20080521022326/http://www.liveclipboard.org/>>, Apr. 21, 2006, 1 Page.

"LiveShare Plus", Picture Tel Corporation, 1997, 2 Pages.

"Microsoft Team RSS Blog : More on SSE", Retrieved From <<https://blogs.msdn.microsoft.com/rssteam/2005/12/07/more-on-sse/>>, Dec. 7, 2005, 1 Page.

"RSSOwl/RSS/RDF/Atom Newsreader", Retrieved From <<http://download.cnet.com/RSSOwl-RSS-RDF-Atom-Newsreader/3000-2164_4-10454013.html, Feb. 1, 2007, 3 Pages.

"Simple Sharing Extensions for RSS and OPML", Retrieved From <<https://blogs.msdn.microsoft.com/rssteam/2005/11/30/simple-sharing-extensions-for-rss-and-opml/>>, Retrieved on: Dec. 14, 2006, 6 Pages.

"Snarfer", Retrieved From <<https://web.archive.org/web/20111027193135/http://www.snarfware.com/download.htm>>, Retrieved on: Jan. 5, 2011, 1 Page.

"The Atom Project", Retrieved From <<http://intertwingly.net/wiki/pie/FrontPage>>, Apr. 5, 2007, 1 Page.

"What is Atom?", Retrieved From <<http://atomenabled.org/>>, Apr. 5, 2007, 3 Pages.

"Working XML: Expand RSS capabilities with RSS extensions", Retrieved From <<http://www.ibm.com/developerworks/library/x-wxxm36/index.html>>, Aug. 15, 2006, 1 Page.

"Amendment after Notice of Allowance Filed in U.S. Appl. No. 11/532,390", dated Dec. 17, 2012, 11 Pages.

"Final Office Action Issued in U.S. Appl. No. 11/532,390", dated Sep. 23, 2009, 24 Pages.

"Final Office Action Issued in U.S. Appl. No. 11/532,390", dated Jul. 22, 2010, 24 Pages.

"Non-Final Office Action Issued in U.S. Appl. No. 11/532,390", dated Jan. 26, 2010, 17 Pages.

"Non-Final Office Action Issued in U.S. Appl. No. 11/532,390", dated Jun. 24, 2011, 18 Pages.

Zaliva, et al., "Enhanced "enclosures" Support in RSS and ATOM Syndication", Retrieved From <<Enhanced "enclosures" support in RSS and ATOM Syndication>>, Dec. 15, 2004, 18 Pages.

"Non-Final Office Action Issued in U.S. Appl. No. 11/532,390", dated Mar. 13, 2009, 77 Pages.

"Notice of Allowance Issued in U.S. Appl. No. 11/532,390", dated Sep. 17, 2012, 47 Pages.

"Notice of Allowance Issued in U.S. Appl. No. 11/532,390", dated Dec. 13, 2011, 8 Pages.

"Preliminary Amendment Filed in U.S. Appl. No. 11/532,390", filed Aug. 15, 2007, 10 Pages.

"Response to Final Office Action Filed in U.S. Appl. No. 11/532,390", filed Sep. 22, 2010, 21 Pages.

"Response to Non-Final Office Action Filed in U.S. Appl. No. 11/532,390", filed Jun. 11, 2009, 17 Pages.

"Response to Non-Final Office Action Filed in U.S. Appl. No. 11/532,390", filed Apr. 26, 2010, 13 Pages.

"Response to Non-Final Office Action Filed in U.S. Appl. No. 11/532,390", filed Sep. 26, 2011, 13 Pages.

"Application as filed in U.S. Appl. No. 11/539,998", filed Oct. 5, 2006, 64 Pages.

"Application as filed in U.S. Appl. No. 11/556,998", filed Nov. 6, 2006, 91 Pages.

"Final Office Action Issued in U.S. Appl. No. 11/557,004", dated Jul. 23, 2010, 29 Pages.

"Final Office Action Issued in U.S. Appl. No. 11/557,004", dated Jun. 12, 2009, 22 Pages.

"Non-Final Office Action Issued in U.S. Appl. No. 11/557,004", dated Nov. 12, 2009, 28 Pages.

"Non-Final Office Action Issued in U.S. Appl. No. 11/557,004", dated Nov. 18, 2008, 44 Pages.

Yang, et al., "Deployment of a Large-scale Peer-to-Peer Social Network", In Proceedings of the First Workshop on seal Large Distributed Systems (WORLDS 2004), Retrieved on: Dec. 14, 2006, 6 Pages.

"Notice of Allowance Issued in U.S. Appl. No. 11/557,004", dated Jun. 14, 2011, 7 Pages.

"Notice of Allowance Issued in U.S. Appl. No. 11/557,004", dated May 13, 2011, 12 Pages.

"Response to Final Office Action Filed in U.S. Appl. No. 11/557,004", filed Sep. 14, 2009, 11 Pages.

"Response to Final Office Action Filed in U.S. Appl. No. 11/557,004", filed Oct. 8, 2010, 13 Pages.

"Response to Non-Final Office Action Filed in U.S. Appl. No. 11/557,004", filed Apr. 12, 2010, 15 Pages.

(56) References Cited

OTHER PUBLICATIONS

"Response to Non-Final Office Action Filed in U.S. Appl. No. 11/557,004", filed Feb. 18, 2009, 14 Pages.
"Application as filed in U.S. Appl. No. 11/609,717", dated Dec. 12, 2006, 101 Pages.
"Non Final Office Action Issued in U.S. Appl. No. 11/621,423", dated Mar. 18, 2009, 10 Pages.
"Notice of Allowability Issued in U.S. Appl. No. 11/621,423", dated Oct. 7, 2009, 7 Pages.
"Notice of Allowance Issued in U.S. Appl. No. 11/621,423", dated Mar. 21, 2012, 7 Pages.
"Notice of Allowance Issued in U.S. Appl. No. 11/621,423", dated Sep. 16, 2011, 8 Pages.
"Notice of Allowance Issued in U.S. Appl. No. 11/621,423", dated Oct. 15, 2012, 8 Pages.
"Final Office Action Issued in U.S. Appl. No. 11/621,433", dated Aug. 28, 2012, 19 Pages.
"Final Office Action Issued in U.S. Appl. No. 11/621,433", dated Jan. 27, 2011, 13 Pages.
"Final Office Action Issued in U.S. Appl. No. 11/621,433", dated Mar. 18, 2010, 16 Pages.
"Non-Final Office Action Issued in U.S. Appl. No. 11/621,433", dated Aug. 31, 2010, 16 Pages.
"Non-Final Office Action Issued in U.S. Appl. No. 11/621,433", dated Aug. 20, 2009, 28 Pages.
"Non-Final Office Action Issued in U.S. Appl. No. 11/621,433", dated Mar. 14, 2012, 22 Pages.
"Response to Final Office Action Filed in U.S. Appl. No. 11/621,433", filed May 15, 2010, 14 Pages.
"Response to Final Office Action Filed in U.S. Appl. No. 11/621,433", filed Mar. 24, 2011, 15 Pages.
"Response to Non-Final Office Action Filed in U.S. Appl. No. 11/621,433", filed Jul. 13, 2012, 11 Pages.
"Response to Non-Final Office Action Filed in U.S. Appl. No. 11/621,433", filed Nov. 26, 2010, 11 Pages.
"Response to Non-Final Office Action Filed in U.S. Appl. No. 11/621,433", filed Nov. 19, 2009, 11 Pages.
"Notice of Allowance Issued in U.S. Appl. No. 11/621,423", dated Feb. 1, 2013, 8 Pages.
"Final Office Action Issued in U.S. Appl. No. 11/674,046", dated Oct. 28, 2010, 30 Pages.
"Final Office Action Issued in U.S. Appl. No. 11/674,046", dated Oct. 21, 2011, 16 Pages.
"Non-Final Office Action Issued in U.S. Appl. No. 11/674,046", dated Apr. 29, 2011, 13 Pages.
"Non-Final Office Action Issued in U.S. Appl. No. 11/674,046", dated Apr. 16, 2010, 42 Pages.
"Response to Final Office Action Filed in U.S. Appl. No. 11/674,046", filed Jan. 18, 2011, 17 Pages.
"Response to Non-Final Office Action Filed in U.S. Appl. No. 11/674,046", filed Jul. 27, 2011, 15 Pages.
"Response to Non-Final Office Action Filed in U.S. Appl. No. 11/674,046", filed Jul. 15, 2010, 18 Pages.
"Final Office Action Issued in U.S. Appl. No. 11/674,054", Mailed Date : Mar. 16, 2012, 42 Pages.
"Final Office Action Issued in U.S. Appl. No. 11/674,054", Mailed Date : Mar. 8, 2010, 35 Pages.
"Non-Final Office Action Issued in U.S. Appl. No. 11/674,054", Mailed Date : Oct. 19, 2011, 45 Pages.
"Non-Final Office Action Issued in U.S. Appl. No. 11/674,054", Mailed Date : Jul. 24, 2009, 28 Pages.
"Non-Final Office Action Issued in U.S. Appl. No. 11/674,054", Mailed Date : Dec. 31, 2012, 47 Pages.
"Response to Final Office Action Filed in U.S. Appl. No. 11/674,054", filed Jul. 2, 2012, 21 Pages.
"Response to Non-Final Office Action Filed in U.S. Appl. No. 11/674,054", filed Dec. 29, 2011, 17 Pages.
"Response to Non-Final Office Action Filed in U.S. Appl. No. 11/674,054", filed Nov. 19, 2009, 18 Pages.

"Applicant Initiated Interview Summary Issued in U.S. Appl. No. 11/674,054", dated Jun. 30, 2010, 26 Pages.
"Advisory Action Issued in U.S. Appl. No. 11/681,321", dated Dec. 2, 2009, 3 Pages.
"Final Office Action Issued in U.S. Appl. No. 11/681,321", dated Jul. 13, 2009, 21 Pages.
"Non-Final Office Action Issued in U.S. Appl. No. 11/681,321", dated Jan. 27, 2009, 36 Pages.
"Non-Final Office Action Issued in U.S. Appl. No. 11/681,321", dated Apr. 23, 2010, 37 Pages.
"Supplemental Notice of Allowability Issued in U.S. Appl. No. 11/681,321", dated Oct. 28, 2010, 11 Pages.
"Notice of Allowance Issued in U.S. Appl. No. 11/681,321", dated Sep. 1, 2010, 26 Pages.
"Notice of Allowance Issued in U.S. Appl. No. 11/681,321", dated Jan. 13, 2011, 34 Pages.
"Response to Final Office Action Filed in U.S. Appl. No. 11/681,321", filed Oct. 19, 2009, 16 Pages.
"Response to Non-Final Office Action Filed in U.S. Appl. No. 11/681,321", filed Jul. 23, 2010, 14 Pages.
"Response to Non-Final Office Action Filed in U.S. Appl. No. 11/681,321", filed Apr. 27, 2009, 15 Pages.
"Response to Notice of Allowance Filed in U.S. Appl. No. 11/681,321", filed Mar. 7, 2011, 11 Pages.
"Amendment after Notice of Allowance Filed in U.S. Appl. No. 12/113,214", filed Sep. 11, 2012, 10 Pages.
"Notice of Allowance Issued in U.S. Appl. No. 12/113,214", dated Jan. 26, 2012, 39 Pages.
"Notice of Allowance Issued in U.S. Appl. No. 12/113,214", dated Jun. 11, 2012, 37 Pages.
"Notice of Allowance Issued in U.S. Appl. No. 12/113,214", dated Sep. 21, 2011, 23 Pages.
"Supplemental Notice of Allowability Issued in U.S. Appl. No. 12/113,214", dated Apr. 12, 2012, 14 Pages.
"Non Final Office Action Issued in U.S. Appl. No. 13/897,889", dated Jul. 28, 2016, 18 Pages.
Antoniu, et al., "JUXMEM: An Adaptive Supportive Platform for Data Sharing on the Grid", Retrieved From <<http://academic.research.microsoft.com/Paper/5749392.aspx>>, Sep. 2003, 1 Page.
Apperley, et al., "Breaking the copy/paste cycle: the Stretchable Selection Tool", Retrieved From <<https://www.computer.org/csdl/proceedings/auic/2000/0515/00/05150003-abs.html>>, Jan. 31, 2000, 4 Pages.
Burcham, Bill, "Baby Steps to Synergistic Web Apps", Retrieved From <<http://lesscode.org/2005/10/21/baby-steps-to-synergistic-web-apps/>>, Oct. 21, 2005, Retrieved on: Oct. 21, 2005, 11 Pages.
Burcham, Bill, "Half a Baby Step", Retrieved From <<http://lesscode.org/2005/11/02/half-a-baby-step/>>, Nov. 2, 2005, Retrieved on: Nov. 2, 2005, 4 Pages.
Burcham, Bill, "Ray Ozzie Demos Web App Clipboard", Retrieved From <<http://www.memerocket.com/2006/03/21/ray-ozzie-demos-web-app-clipboard/>>, Mar. 21, 2006, 6 Pages.
Burcham, Bill, "Ray Ozzie Got the Memo", Retrieved From <<http://lesscode.org/2006/03/22/ray-ozzie-got-the-memo/>>, Mar. 22, 2006, Retrieved on: Mar. 22, 2006, 3 Pages.
Cheung, et al., "Automatic Device Configuration and Data Validation through Mobile Communication", In Proceedings of IEEE Pacific Rim Conference on Communications, Computers and signal Processing, PACRIM, vol. 1, Aug. 28, 2003, 4 Pages.
Chmielewski, et al., "A Distributed Platform for Archiving and Retrieving RSS Feeds", In Proceedings of Fourth Annual ACIS International Conference on Computer and Information Science (ICIS'05), Jul. 14, 2005, 1 Page.
Chudnov, et al., "Introducing UnAPI", In Proceedings of Ariadne, Issue 48, Jul. 30, 2006, 15 Pages.
Dargahi, Ross, "A Pint of Ale—Ajax Linking and Embedding", Retrieved From <<https://blog.zimbra.com/2006/04/a-pint-of-ale-ajax-linking-and-embedding/>>, Apr. 3, 2006, 5 Pages.
Goodman, et al., "JavaScript Bible", In Book "JavaScript Bible", 6th Edition, Apr. 9, 2007, 3 Pages.
Gregorio, et al., "The Atom Publishing Protocol", Network Working Group, Mar. 4, 2007, 60 Pages.

(56) References Cited

OTHER PUBLICATIONS

Hansen, et al., "RSS as a Distribution Medium for Gao-spatial Hypermedia", In Proceedings of the sixteenth ACM conference on Hypertext and hypermedia, Hypertext '05, Sep. 2005, 3 Pages.

Hinchcliffe, Dion, "How Simple Sharing Extensions Will Change the Web", Retrieved From <<http://web.archive.org/web/20061206134356/http://web2.wsj2.com/how_simple_sharing_extensions_will_change_the_web.htm>>, Nov. 28, 2005, 10 Pages.

Kawell, et al., "Replicated Document Management in a Group Communication System", In Proceedings of 1988 ACM conference on Computer-supported cooperative work, CSCW '88, Sep. 26, 1988, 10 Pages.

Miller, et al., "Synchronizing Clipboards of Multiple Computers", Proceedings of the 12th annual ACM symposium on User interface software and technology, Nov. 1999, pp. 65-66.

Moromisato, George, "Microsoft Team RSS Blog: SSE Update and Tutorial", Retrieved From <<http://blogs.msdn.com/rssteam/archive/2006/01125/517473.aspx>>, Jan. 26, 2006, 5 Pages.

Nummi, Tomi, "The Technical Infrastructure of the LIVE Project", Retrieved From <<https://web.archive.org/web/20070305221346/http://www.edu.helsinki.fi/media/mep6/nummi.pdf, Retrieved on: Dec. 14, 2006, 11 Pages.

Obasanjo, Dare, "Meladata Quality, Events Databases and Live Clipboard", Retrieved From <<http://www.25hoursaday.com/weblog/2006/04/04/MetadataQualityEventsDatabasesAndLiveClipboard.aspx, Apr. 3, 2006, 4 Pages.

Ozzie, et al., "Live Clipboard", Retrieved From <<http://spaces.live.com/editorial/rayozzie/demo/liveclip/specification/v092.html>>, Retrieved on: Dec. 14, 2006, 15 Pages.

Ozzie, Ray, "Ray Ozzie Blog: Really Simple Sharing", Retrieved From <<http://rayozzie.spaces.live.com/blog/cns/FB3017FBB9B2F1421175.entry>>, Nov. 20, 2005, 4 Pages.

Ozzie, et al., "Simple Sharing Extensions for Atom and RSS", Retrieved From <<https://msdn.microsoft.com/en-us/library/gg427657(v=vs.85).aspx, May 7, 2008, 18 Pages.

Ozzie, Ray, "Wiring Progress", Blog Posted online, Apr. 1, 2006, 3 Pages.

Ozzie, Ray, "Wiring the Web", Retrieved From <<https://web.archive.org/web/20060615210805/http://rayozzie.spaces.msn.com/blog/cnsIFB3017FBB9B2E142!285.entry>>, Mar. 2007, 5 Pages.

Rimey, Ken, "Version Headers for Flexible Synchronization and Conflict Resolution", Retrieved From <<http://www.niit.fi/files/admin/publications/Technical_Reports/hiit-2004-3.pdf>>, Nov. 22, 2004, 14 Pages.

Roisin, et al., "Implementing the Cut-and-Paste Operation in Structured Editing System", In Proceedings of PODP 94, Mar. 1994, 14 Pages.

Shlegel, Cori, "Simple Sharing Extensions up close", Retrieved From <<https://web.archive.org/web/20051125015306/http://kinrowan.net/blog/wp/archives/2005/11/23/sse-up-close>>, Nov. 23, 2005, 6 Pages.

Spinellis, et al. "Outwit: Unix Tool-based Programming Meets the Windows World", In Proceedings of the USENIX Technical Conference, 2000, Jun. 18, 2000, 8 Pages.

Stylos, et al., "Citrine: Providing Intelligent Copy-and-Paste", In Proceedings of the 17th annual ACM symposium on User interface software and technology, UIST '04, Oct. 24, 2004, 4 Pages.

Udell, Jon, "Dueling simplicities", Retrieved From:<<https://web.archive.org/web/20090311035645/http://weblog.infoworld.com/udell/2005/11/22.html>>, Nov. 22, 2005, 2 Pages.

Winer, Dave, "RFC: MetaWeblog API", Retrieved From <<http://xmlrpc.scripting.com/metaWeblogApi.html>>, Mar. 14, 2002, 4 Pages.

Wittenbrink, Heinz, "RSS and Atom: Understanding and Implementing Content Feeds and Syndication", Retrieved From <<http://www.packtpub.com/rss/book>>, Retrieved on: Dec. 15, 2011, 3 Pages.

"Final Office Action Issued in U.S. Appl. No. 13/897,889", dated Mar. 31, 2017, 13 pages.

* cited by examiner

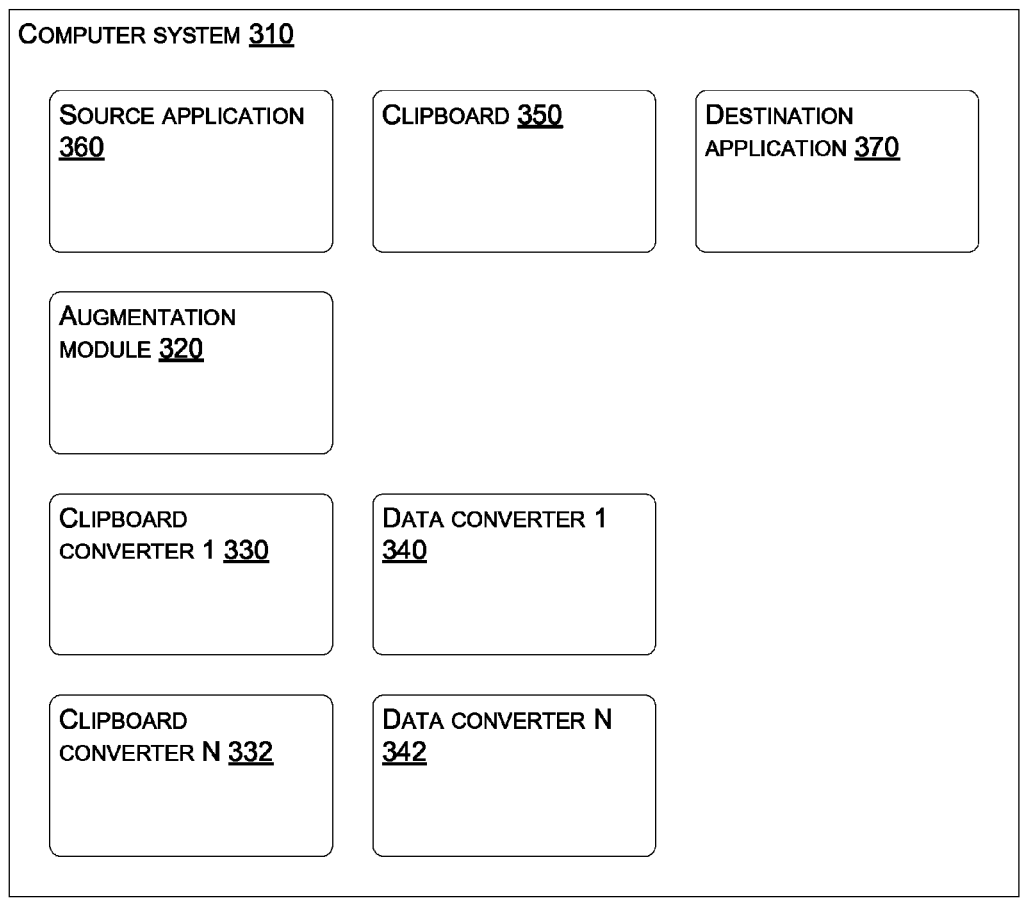
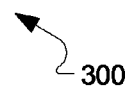
FIG. 3

CLIPBOARD AUGMENTATION WITH REFERENCES

RELATED APPLICATIONS

This application is a continuation of U.S. patent application Ser. No. 11/621,423, filed on Jan. 9, 2007, which is incorporated by reference herein in its entirety, where Ser. No. 11/621,423 is a continuation-in-part of U.S. patent application Ser. No. 11/557,004, filed Nov. 6, 2006.

BACKGROUND

Users of modern operating systems and applications may be accustomed to using a "clipboard" to copy and paste a wide variety of data between different screens and applications. In addition to holding multiple clipboard data items, some clipboard systems have the ability to represent or contain multiple formats for a given item. For example, when a user copies, say, a set of cells from a spreadsheet, the spreadsheet application may place those cells on the clipboard in multiple formats. For example, for the copied spreadsheet cells, a clipboard might contain a plain text representation, a formatted text representation (in one or more of a variety of formats), an image representation, an application-specific representation that contains all of the cell information, and so on. When a user pastes the spreadsheet cells into a particular application, the application may request or use a particular format. For example, a text editor may only understand and use the plain text representation, an image editing program may use the image representation, another instance of the same spreadsheet application may use the spreadsheet data, and so on.

While a clipboard system may have the capability of supporting multiple formats for the same item, it is not always the case that a particular format that may be most useful for a destination is included in the format or formats provided by the source of the data. As just one example, a personal information management (PIM) application may have the ability to automatically create a contact, with the appropriate fields already populated, when the user pastes data that the PIM application recognizes as a contact. For example, the PIM application might recognize data formatted using the vCard standard. However, even when a source application has all of the information required to create a contact—the name, address, phone number(s), references to social media data and so on—it may not know how to format this information in a specific format that may be required by some other application. Continuing this example, if the source provides the contact data in another format—like hCard—then the destination may not recognize the data as a contact and may not automatically create a contact using the pasted data. As a result, the transfer of data between different applications may be limited to a lower fidelity representation, like strings of text. In this example, even if both a source and destination application understand contact data, if they do not exchange contact data in formats supported by both the source and destination applications then a user may still need to, for example, manually copy individual fields—like name, address, and so on—between applications.

In another example, a user might place data from a source on a clipboard where the data includes some kind of reference to additional or other information. However, instead of pasting the reference itself, the user might instead want to paste the data referred to or referenced by the reference, or at least some data that is associated with or related to the referenced data. For example, a user might have a Uniform Resource Locator (URL)—perhaps represented using a text format—that references an image, and might want to paste the actual image instead of just the reference. The user might be able to retrieve the actual image by first copying the URL to the clipboard. The user might then paste the URL into a web browser, instruct the web browser to retrieve the image, and manually save the image retrieved by the web browser. In this example, the user is required to perform a number of additional steps because the information they can place on a clipboard doesn't contain the actual information they want to paste.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Among other things, one or more systems and/or techniques for managing clipboard data are disclosed herein. In particular, copy data comprising a reference may be received. For example, the copy data may comprise contact data from a personal information management (PIM) application. The contact data may comprise personal information of an individual, such as address, phone number, a URL reference to a website of the individual, such as an HTML social media website. The copy data may be placed within a clipboard. It may be appreciated that the reference may refer to supplemental data, which may also be placed on the clipboard and used to augment the copy data, for example, and the supplemental data may reference additional data which may also be retrieved and placed within the clipboard. For example, the reference may comprise a URL reference associated with HTML data, such as an HTML social media website. Supplemental data referred to by the reference may be retrieved. For example, a URL reference associated with an HTML social media website may be used to retrieve supplemental data, such as social media data (e.g., a profile image, a profile message, profile data, audio data, video data, text, a friend list, shared images, etc.). In particular, the HTML social media website may be navigated to using the URL reference. The social media data may be retrieved from the HTML social media website as the supplemental data.

DESCRIPTION OF THE DRAWINGS

FIG. 3 illustrates an exemplary system in which clipboard augmentation may be performed.

DETAILED DESCRIPTION

The present invention extends to various techniques and technologies directed toward augmenting data placed on a clipboard with additional data. More particularly, described herein are, among other things, methods, systems, and data structures that facilitate the augmentation of data on a clipboard. In some implementations the data placed on the clipboard may include one or more references to other information and the additional data placed on the clipboard may be associated with a reference. In these or other cases augmenting might involve retrieving data referred to by a reference and placing such data, or data associated with such data, on the clipboard. As just one example, augmenting might involve resolving a reference, like a URL or the content of an RSS feed, into data indicated by the reference, and placing such data on the clipboard.

Figure 1:
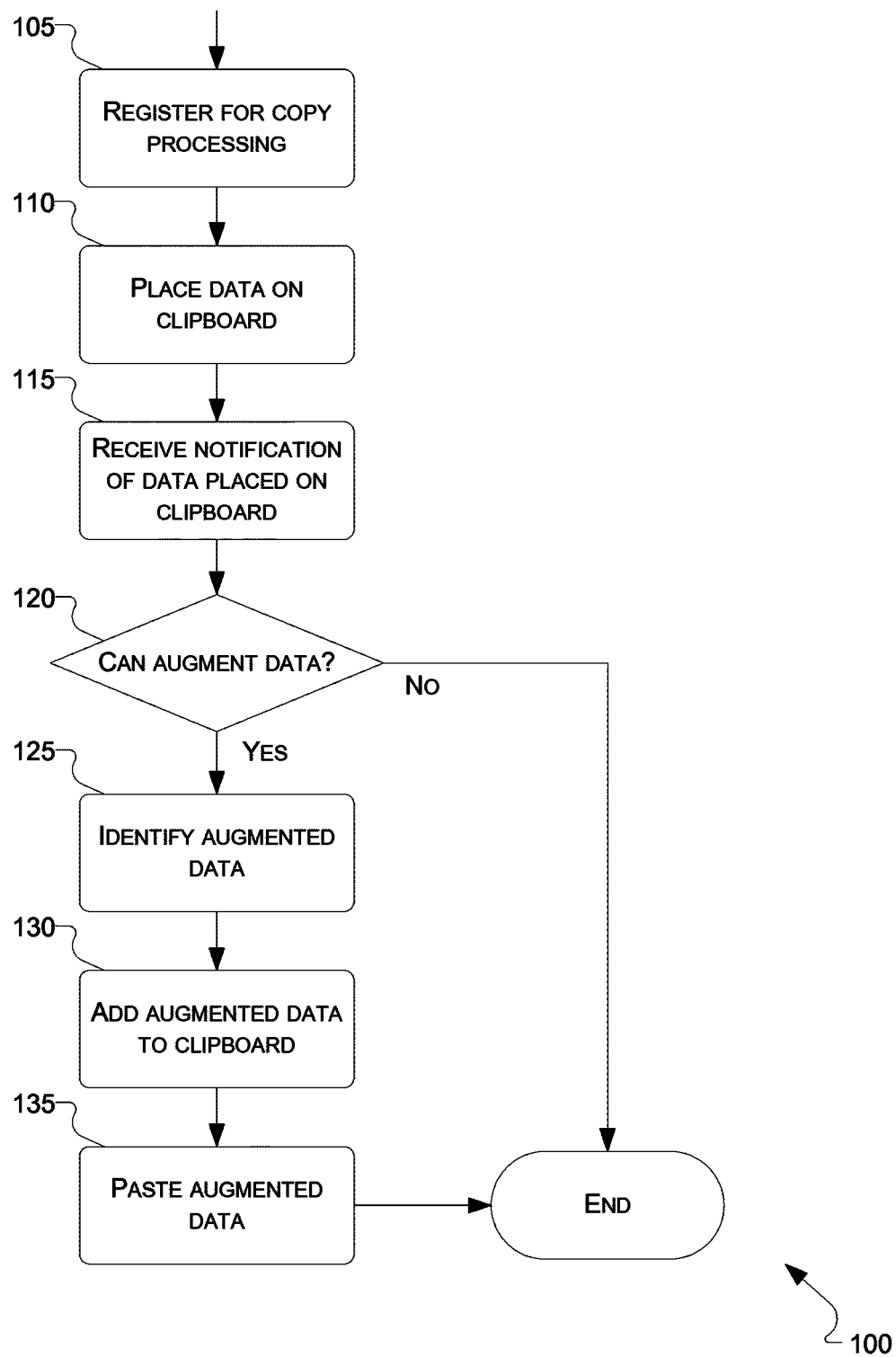
FIG. 1 illustrates an exemplary generalized operational flow including various operations that may be performed when augmenting data on a clipboard.

Turning now to FIG. 1, shown therein is an exemplary generalized operational flow 100 including various operations that may be performed when augmenting data on a clipboard. The following description of FIG. 1 may be made with reference to other figures. However, it should be understood that the operational flow described with reference to FIG. 1 is not intended to be limited to being used with the elements described with reference to these other figures. In addition, while the exemplary operational flow of FIG. 1 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In at least one implementation of operation 105, the operational flow may register for copy processing. For example, with some clipboard implementations executable code may be registered with the clipboard system so that the clipboard system calls the registered code when certain events happen, including when data is added to or changed on the clipboard. In some implementations, this operation may perform one or more of such registrations so that at some subsequent point in time, when information on the clipboard changes, for example, the registered code may be called. In other implementations, including at least some where the determination of whether data has been added to the clipboard is performed in a different manner, this operation may be performed differently, or may not be needed or performed.

In an exemplary implementation of operation 110, data is placed on a clipboard. This may be accomplished by any of a variety of applications or executable code that has the capability to add data to a clipboard. The data placed on the clipboard may encompass a variety of types of data, including more than one type of data. For example, when a user chooses to copy text in a word processing application, the word processing application may add the text—which is the data being copied in this example—to the clipboard in a variety of formats. One such format added by the word processing application may be a formatted text representation that is perhaps specific to the word processing application. The word processing application might also add formatted text using a common formatted text representation, like Rich Text Format (RTF) or HTML. Such formatted text representations might be useful if the data is later pasted into an application that can recognize or otherwise use formatted text. The same word processing application might also add the copied text in a non-formatted, or plain, text representation. The plain text representation may be useful, for example, when the data is pasted into a text editor that does not understand or display formatted text. The word processing application might also add the text as an image (or may add multiple images). Such image or images may be useful if the text data is pasted into an application—perhaps like an image processing application—that can display images but does not include text editing capabilities.

In some cases the data placed on the clipboard may comprise or include one or more references to other data or information. Such references may be represented using any of a variety of reference types or formats, as long as the reference refers to or identifies some other data. For example, in some cases the data added to a clipboard might include one or more references that might be embodied in more or more URLs that may in turn reference a wide variety of data—one URL might reference an HTML or other type of text document; another URL might reference an image, like a JPEG image; and so on. In other implementations, the reference might be embodied in different forms, like a file system path (to either a local or networked and remote file system location), a memory location, or any other type of reference.

In yet other implementations, data added to a clipboard might contain a reference to information that in turn also contains references. For example, in some implementations the data placed on a clipboard might contain a URL that references an RSS feed, and the RSS feed itself might contain any number of URLs or other references to additional data, including text, images, other binary content like audio or video files or streams, and so on.

In some implementations, the data that is placed on the clipboard may be represented, at least in part, using some type of container format. For example, rather than just adding a text representation of, say, a contact—including name, address, phone number(s), and so on—in, say, the vCard format, the source application may first "wrap" the vCard data in a container format that may provide additional information about the enclosed data. Or, instead of just adding a text representation of, say, a URL, the source application might first wrap the URL or other reference (or references) in a container format that may provide additional information about the enclosed data. One such format might be the same as or similar to the container format that is explained in more detail below, with reference to FIG. 4.

In at least one implementation of operation 115, a clipboard augmentation system may receive some type of notification that indicates that data has been placed on the clipboard. This notification may be implemented in a variety of ways. For example, as has been previously described with reference to operation 105, in some clipboard implementations, executable code may be registered with the clipboard system so that the clipboard system calls the registered code when certain events happen, including when data is added to or changed on the clipboard. For example, in such a system, when new data is added to the clipboard, for example, as part of the execution of an operation like operation 110, the clipboard system may implement the notification of operation 115 by calling code that was previously registered with the clipboard system to be called when data is added to the clipboard.

In the same or another implementation, executable code may periodically "poll" the clipboard to determine if the clipboard contains data to be processed or examined. During such a polling operation, if data is found that needs to be processed—for example, perhaps new data has been added to the clipboard since the last polling operation—then the executable code may provide a notification that data has been placed on the clipboard and should be processed. In at least some implementations like this, operation 105 may not be needed or performed.

In an exemplary implementation of operation 120, it is determined if data on the clipboard may be augmented. If the data may not be augmented, the operational flow 100 may end. If data may be augmented, the operational flow may proceed to operation 125.

The determination of whether data on the clipboard may be augmented may be made using one or more of a variety of criteria. In some implementations, one determining factor may be related to characteristics of the data that was placed on the clipboard and resulted in the notification. For example, the clipboard augmentation code may be able to augment data in one set of formats and not know how to augment data in another set of formats. In an implementation like this, one of the determining factors used to determine if data can be augmented might be whether the data added to the clipboard is in a format that the clipboard augmentation system can recognize and augment. For example, contact information in a particular format may be recognized while general text, contact information in another format, and so on, may not be recognized. Reference information like a URL may be recognized while some other types of reference information may not recognized, and so on.

Figure 4:
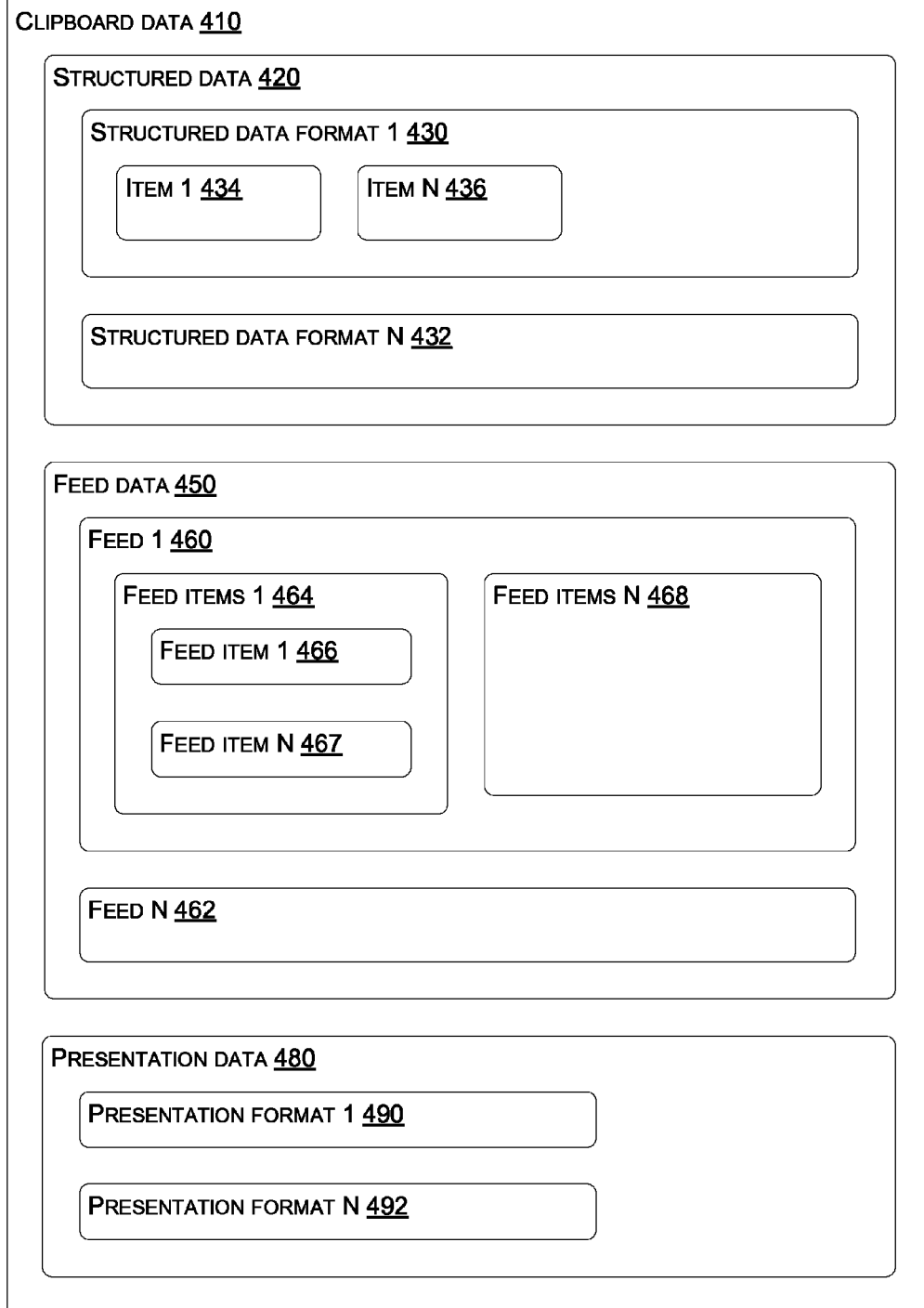
FIG. 4 illustrates an exemplary system that includes a graphical example of one mechanism for representing clipboard data, including a transfer representation of data.

This determination may also be made in some implementations using a container format, such as, for example, the format described below with reference to FIG. 4. In at least some of these implementations, a system may only be able to augment data that is presented in a particular recognized container format. In some implementations, such systems may also further examine other data provided by the container format to determine if the data may be augmented. For example, if data that uses the format described below with respect to FIG. 4 is added to the clipboard, the type of data—perhaps indicated by the "type" and/or "contenttype" attributes of the data—may be examined. If data of the particular indicated type is recognized and may be augmented, the determination of whether data on the clipboard may be augmented may be made in the affirmative and the operational flow may proceed to operation 125; otherwise the operational flow may end.

In an exemplary implementation of operation 125, the actual augmented data may be determined. The manner or manners in which this operation is implemented may vary depending on the nature of the data placed on the clipboard and the nature of the augmented data that is identified. In some implementations, this operation may convert or translate data placed on the clipboard into some other format or representation (or to multiple other formats or representations). In the same or other implementations, including those where the data placed on the clipboard includes a reference or references to other information or data, this operation may use the reference or the information to which the reference refers as part of identifying the augmented data.

For example, perhaps in a case where the data placed on the clipboard does not include a reference, if it is determined that, say, contact data represented using the hCard format may be converted, this operation may convert from the hCard format to another format, like the vCard format, or to some other contact representation format, or other format entirely.

In another example, if it is determined that the data includes information in some type of presentation format, perhaps like HTML, at least part of the augmented data may include a representation of the data in that presentation format. The augmented data might in some cases be retrieved directly from the data placed on the clipboard. For example, in cases where the data is represented using a container format similar to or the same as the format described below with reference to FIG. 4, presentation data may be represented using one or more "format" elements that are children of a "presentations" element (presentation data may also exist elsewhere). In at least some implementations, the identified augmented data might include a representation of the data that might be retrieved or associated with information in or beneath the "presentations" element.

In another example, the data placed on the clipboard might contain one or more references. In at least some of such implementations, some of identifying the augmented data might involve retrieving the data referred to or referenced by the reference (or references). For example, in some implementations, the data placed on the clipboard might contain, say, a URL. In at least some cases, then, identifying the augmented data might be implemented, at least in part, by retrieving the information located at the specified URL and using that information to identify all or at least part of the augmented data. In some cases, the actual retrieved data may be the identified augmented data. For example, a URL that refers to an image file might result in the retrieval of the image file and the identification of the image file as being the augmented data. In other implementations or cases, the retrieved information might be used as all or part of some process that identifies some other augmented data. For example, a reference might refer to text in a particular format. After the text to which the reference refers has been retrieved, the referenced text might then be transformed into some other representation, perhaps using a transform specification (explained in more detail below) or other executable code. The result of such a transformation might then comprise the augmented data.

In some implementations, data placed on a clipboard may include one or more references that refer to information that itself contains references to additional data. In such cases, identifying the augmented data might involve retrieving the information referred to by the reference, and then also retrieving information referred to by the data that was itself already retrieved. For example, data placed on a clipboard might contain a reference to an RSS feed, and the RSS feed itself might contain references to additional data. In such an example, the identification of augmented data might involve first retrieving the contents of the RSS feed, and then retrieving some or all of the information to which the RSS feed refers. For example, in a scenario where the RSS feed refers to a number of image or audio files, the identification of augmented data may involve the retrieval of the RSS feed, and then the retrieval of some or all of the referenced image or audio files.

In at least some implementations, input data—whether it is data placed on the clipboard or retrieved data identified by a reference placed on the clipboard—might be changed or transformed as part of identifying the augmented data. A change or transformation like this might be implemented in a variety of ways. In some implementations, the change might be implemented using some kind of transform system that may in turn use transform specifications. A transform specification may consist of one or more rules or sets of data that define how data in one format may be translated to data in another format. One example of such a transform language may be the Extensible Stylesheet Language Transform (XSLT) language. Given an XSLT transform specification, or with some other type of transform specification, the input data may be transformed to produce some or all of the augmented data. The transformation may be implemented using, for example, an XSLT interpreter that accepts input data and an XSLT transform specification and produces output data. Another manner in which a change may be implemented may involve executable code. This executable code may have access to the data that was added to the clipboard or retrieved using a reference and may perform any manipulation, processing, or the like, to produce the desired augmented data. In this context, and in at least some implementations, the executable code may comprise a compiled or otherwise translated representation of executable code. In the same or other implementations, the executable code may also or solely comprise "script" code, including code that may not be compiled and may instead be interpreted or otherwise processed during execution. Such code may include not only script code in a "traditional" programming language, but also any other representation of instructions that may produce augmented data, including representations like human-readable directives stored in a CSV or other file, and so on.

Another type of augmented data that might be identified in an at least some implementations of operation 125 might include the result of transferring or duplicating data placed on the clipboard so that the data may be represented on the clipboard, after augmentation, using more than one type of clipboard data format. For example, with some clipboard systems on some operating systems, at various times, including before or after augmentation, a particular clipboard data item may have data in a text format—perhaps denoted using an identifier like CF_TEXT—and may also have data in other data formats with identifiers like CF_HTML, and so on. In these implementations, or in other implementations, it may be possible to use, for example, a data format that is defined for or associated with something like a container format like that described below with reference to FIG. 4. Such a data format might use an identifier like CF_LIVECLIPBOARD, or some other identifier. In such cases, or in other cases, one type of augmented data that may be identified might include a representation of the data placed on the clipboard, but in the data format defined for or associated with the container format. In just one specific example, the data originally placed on the clipboard might be text, perhaps identified using CF_TEXT, that contains XML that conforms to the container format described below with reference to FIG. 4. In this case, at least some of the augmented data might include the same XML data, but identified using the CF_LIVECLIPBOARD data format. Augmented data like this might be useful for a variety of reasons, including because it might be able to hold additional information, like perhaps an identification of the entity that pasted the original data, that may in some implementations not be represented using, for example, the initial data in the text data format.

In addition, in some implementations, more than one type of augmented data may be generated. That is, some clipboard augmentation systems may, at least in some cases, generate more than one type of augmented data for particular types of data placed on the clipboard.

In an exemplary implementation of operation 130, the augmented data previously identified, for example, in operation 125, may be added to the clipboard in some fashion. In some cases the implementation of this operation may consist of using a clipboard interaction application programming interface (API) provided by the clipboard system to add new data.

In some implementations, the augmented data added to the clipboard may be identified as being associated with the data placed on the clipboard in the first place, and having an alternate data format. That is, both the data initially placed on the clipboard and the augmented data later placed on the clipboard may provide alternate data format representations for the same single clipboard data item. This might be the case, as just one example, when the data originally placed on the clipboard includes, say, a text representation of the clipboard data item, and the augmented data includes, say, an image representation of the same data.

In the same or other implementations, the augmented data placed on the clipboard may result in entirely new clipboard data items that are not specified to comprise alternate data formats or representations for a clipboard data item that is already on the clipboard. As just one example, in one implementation where the data initially placed on the clipboard includes a reference to an RSS feed, and multiple pieces of data referenced by the RSS feed are retrieved and identified as augmented data, some or all of the retrieved data may be added to the clipboard as new clipboard data items.

In some cases this operation may also include additional processing to ensure that the data that is added to the clipboard is available in a format that may be usable by a destination. For example, a particular PIM application may understand data provided, for example, in vCard format. However, it may not understand vCard data that is added to the clipboard as text. Instead, it may require that the vCard data is saved to a file, and that a reference to the file be provided on the clipboard instead. In a situation like this, or in another situation where the data must be provided in a particular format requiring further processing, this step may perform such processing. In this example, the operation might save the vCard data to a file and specify the name and location of the newly created file in the data that it adds to the clipboard. In other implementations, such processing may be performed in other operations—for example, it might be performed as part of operation 125, when the augmented data is identified.

Finally, in an exemplary implementation of operation 135, the data added to the clipboard may be pasted into an application or other entity that may accept data pasted from the clipboard.

Generally, as used herein, a "clipboard" or "clipboard system" should be interpreted as an entity that provides functionality associated with the transfer of data between different entities, including, for example, between different applications, web pages, and so on. Some of such computer-implemented clipboard systems may provide the capabilities of adding data to a clipboard—perhaps associated with a copy or cut operation—and reading data from a clipboard—perhaps associated with a paste operation. The same or other clipboard systems may provide the ability to hold multiple pieces of data, or items, at the same time. Furthermore, the same or other clipboard systems may provide the ability to hold multiple representations or formats for a particular data item. For example, a clipboard system might have the ability to hold, say, a formatted text, plain text, and image representation of the same item. The same or other clipboard systems may enable a destination application to use or request a particular format or representation of an item. For example, a word processing application might use the formatted text representation, a simple text editor the plain text representation, and an image processing application the image representation.

It should also be noted that, as used herein in the context of transferring information, the term "copy" may also include a "cut" operation, where the difference may be that data associated with a copy operation may remain in the location from which it is being copied. In contrast, data being "cut" may be removed or hidden, through some means, from the location from which it is being copied. In both copy and cut operations, data may be placed on the clipboard—the difference may be in what happens at the location from which the data is copied or cut.

Finally, it should be noted that in some implementations cut, copy, and paste operations may be performed through multiple different user interface actions. For example, a user may initiate a copy operation using a "Copy" menu item, using a keyboard command like "Control-C," or some other command, and so on. In some embodiments, a user may also employ one or more of a variety of other actions, such as "drag and drop" gestures. For example, a user may select, indicate, or otherwise identify some data to be copied or cut by, say, selecting the data using computer mouse movements, and then initiate a copy or cut operation by "dragging" the selected entity or data to some other location— perhaps by clicking and holding a mouse button, and then finally "drop" the entity to initiate a paste operation at the indicated location. As used herein, copy, cut, and paste operations should be considered to encompass any set of user actions or gestures, including those associated with such drag and drop systems.

Figure 2:
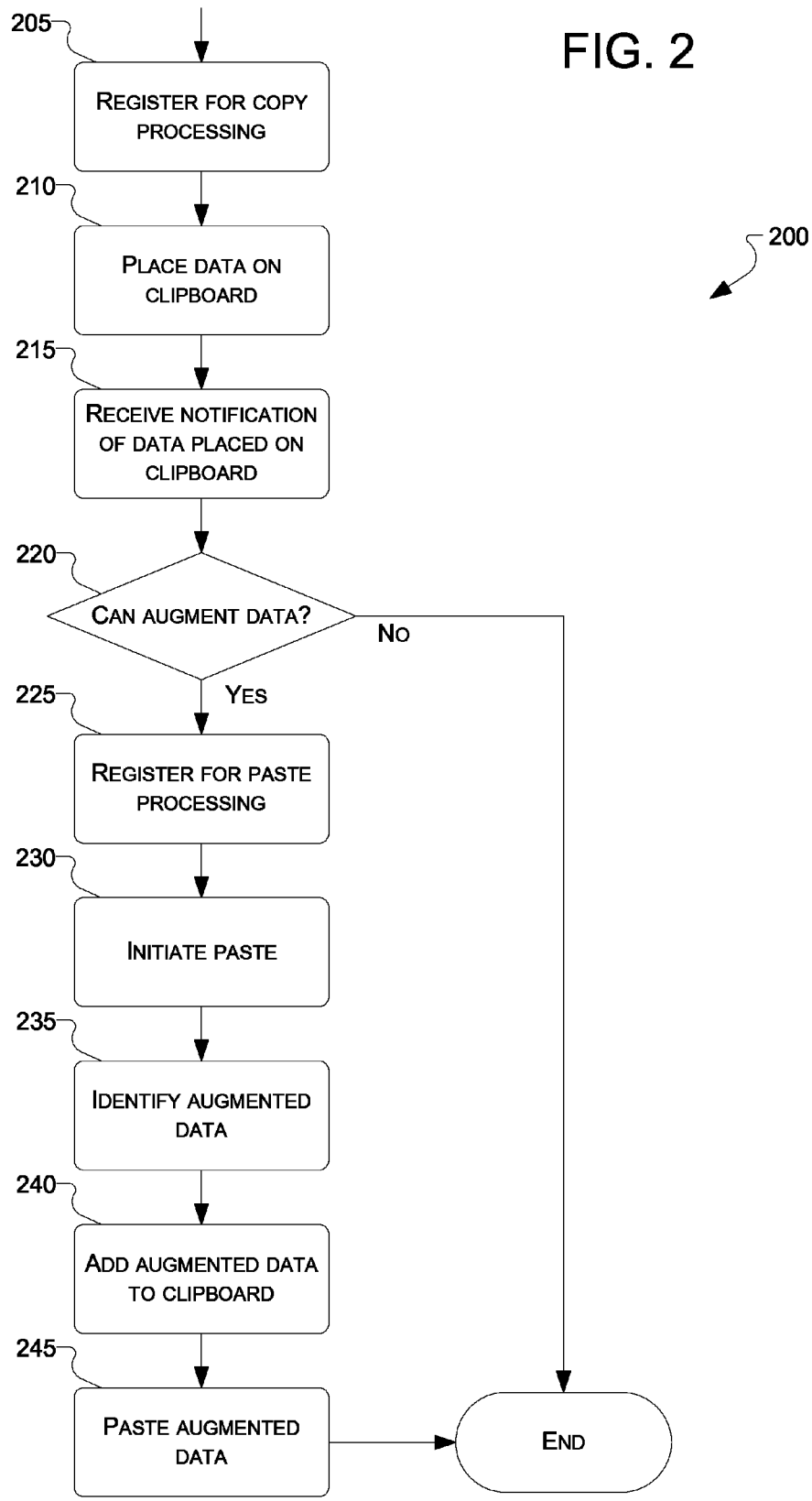
FIG. 2 illustrates an exemplary generalized operational flow including various operations that may be performed when augmenting data on a clipboard, where the identification of the augmented data may only be performed in some cases when the data is needed during a paste operation.

Turning now to FIG. 2, shown therein is an exemplary generalized operational flow 200 including various operations that may be performed when augmenting data on a clipboard using "delayed rendering," where the identification of the augmented data may only be performed in some cases when the data is needed during a paste operation. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In summary, the operational flow 200 is similar to or the same as the operational flow 100 in many respects, but differs in how the augmented data is added to the clipboard such that the augmented data may only be added to the clipboard when it is needed, for example, to service a paste operation. For example, suppose that part of the augmentation process for a particular type of input data requires that a reference on the clipboard be resolved and the data to which the reference refers be identified. For example, this might be the case where a URL to an image is augmented by retrieving the actual image and adding the image itself to the clipboard. Depending on the size of the image, the characteristics of the network connection to the server or servers on which the image resides, and so on, identifying the augmented data by retrieving the image may take a non-negligible amount of time. In a situation like this, or in other situations, it may be desirable to avoid identifying the augmented data until, for example, one is sure that the augmented data will be used, pasted, or the like. The operational flow 100 described previously with reference to FIG. 1 does not do this, as it may identify the augmented data at close to the same time as the original data is placed on the clipboard.

In some implementations, operation 205 may be similar to the previously discussed operation 105, operation 210 to the previously discussed operation 110, operation 215 to the previously discussed operation 115, and operation 220 to the previously discussed operation 220. In other implementations, these operations may be different.

Continuing, after it is determined that the data added to the clipboard may be augmented, in an exemplary implementation of operation 225 the operational flow may register for paste processing. In general, this may involve registering for further processing in at least some situations. For example, a clipboard system may provide the ability to call back to a provided function when a user requests that data of a particular type be pasted. In an implementation like this, and continuing with the example where the augmented data requires the download of an image, for example, it may be possible to register to receive a callback when a user initiates a paste and requests an image. When a destination requests an image during a paste operation, the clipboard system or other executable code may call the registered function or functions, and the function may perform any necessary processing to, in this example, download the image and place it on the clipboard. In other implementations, registering for paste processing may involve different or additional steps.

After registering for paste processing, some implementations of the operational flow 200 may not execute any further operations until the point at which a paste operation is initiated that necessitates the further processing for which the registration was submitted, for example, in operation 225. So, in at least one exemplary implementation of operation 230, a paste operation is initiated. For example, in some cases this paste operation may be for a format or formats for which further processing was requested in operation 225. The paste operation may be initiated in a variety of ways, including by using a "Paste" menu item associated with a destination application, by pressing a keyboard command associated with paste—like "Control-V"—and so on.

Now that further processing has been requested, operation 235 and operation 240 may be executed to identify and add the augmented data to the clipboard, and then operation 245 may be executed to paste that data into a destination application. In some cases, the implementations of operation 235, operation 240, and operation 245 may be the same as or similar to the implementation of the similar operations described previously with reference to FIG. 1. That is, operation 235 may be implemented similarly to the previously described operation 125, operation 240 may be implemented similarly to the previously described operation 130, and operation 245 may be implemented similarly to the previously described operation 135. In other implementations, these operations may be implemented differently.

Turning now to FIG. 3, shown therein is an exemplary system 300 in which clipboard augmentation may be performed. The exemplary system 300 may contain a computer system 310, a source application 360, a clipboard 350, a destination application 370, an augmentation module 320, a clipboard converter 1 330, a clipboard converter N 332, a data converter 1 340, and a data converter N 342. This description of FIG. 3 may be made with reference to other figures. However, it should be understood that the elements described with reference to FIG. 3 are not intended to be limited to being used with the elements described with reference to other figures. In addition, while the exemplary diagram in FIG. 3 indicates particular elements, in some implementations not all of these elements may exist, and in some implementations additional elements may exist. Furthermore, while the exemplary diagram shows elements as being part of or contained by a particular computer system, for example, it should be noted that one or more modules may also be implemented by one or more other computer systems and connected to the exemplary illustrated computer system by any means sufficient for exchanging any necessary data.

The exemplary augmentation module 320 may be configured in at least some implementations to perform some or all of the steps introduced previously with respect to the operational flow 100 of FIG. 1 and operational flow 200 of FIG. 2. That is, for example, the augmentation module may be configured to "watch" or be notified when information is added to the clipboard 350 and, when information is added, to in some cases augment the information with additional information.

The source application 360 may be any application or other entity that is capable of placing data on the clipboard 350. The source application may do so in a variety of ways, including through the use of operating system functionality or user interface controls that provide access to the clipboard, through the use of clipboard APIs, and so on. The destination application 370 may similarly be any application that is capable of accepting data from the clipboard 350, perhaps using a paste operation. The destination application may accept information using user interface controls, clipboard APIs, and so on.

The clipboard 350 may represent a clipboard system provided by the operating system, by one or more applications, or by any other entity. As has been discussed previously, a clipboard system like the clipboard system 350 may generally be capable of accepting data (using a "copy" or "cut" operation, for example) and providing data (using a "paste" operation, for example). Some clipboard systems may be capable of interacting across applications on a particular computer system or computing device, others may be capable of operating across computer systems running the same or different operating systems, others may only operate across instances of a particular application or applications, and so on. Furthermore, as also has been discussed previously, clipboard systems may provide a variety of additional functionality, including the capability of storing a particular data item using multiple different formats, or the capability of performing delayed rendering, where the addition of data to the clipboard may be postponed, for example, until the time particular data is requested.

The augmentation module 320 may in some implementations use one or more clipboard converters, including clipboard converter 1 330 and clipboard converter N 332. Generally, a clipboard converter may be capable of converting one or more particular types of input into one or more particular types of output. For example, an hCard-to-vCard clipboard converter might convert hCard data to the vCard format (after which the augmentation module might add the augmented vCard data to the clipboard). A clipboard converter may produce its output data using a transform specification, arbitrary executable code, or some other mechanisms, for example.

In some implementations, a clipboard converter may further be responsible for additional processing that may be required or useful in particular environments, operating systems, with particular applications, or the like. That is, a clipboard converter may also perform "platform-dependent" processing that may be useful on a certain platform or in a certain environment or environments. For example, if a particular PIM application requires that contact data in the vCard format be provided as a reference to a file (instead of, for example, simply as text on the clipboard), then a clipboard converter may save the converted vCard data to a file and add a reference to that file to the clipboard.

This difference between platform-independent processing and platform-dependent processing may in some implementations be related to the use of one or more data converters, such as data converter 1 340 and data converter N 342. Generally, a data converter may be responsible for producing data in one or more formats given input data in one or more other formats. A data converter may generally not be responsible for performing platform-dependent processing, and in this case, such platform-dependent processing may then may be left to a clipboard converter that uses a particular data converter. For example, using the previously presented example where the input is contact data in the hCard format and the desired output is a file that contains vCard data, a clipboard converter may receive the input hCard data, may then use a data converter to convert from the hCard representation to a vCard representation, and may then save the converted vCard data produced by the data converter to a file and add a reference to the new file to the clipboard.

While it may be possible to identify multiple pieces of augmented data using, for example, a single augmentation module 320 and one or more clipboard converters, it may also be possible in some implementations to identify multiple pieces of augmented data using more than one augmentation module 320. For example, the augmentation module 320 might identify certain types or pieces of augmented data, while another augmentation module, perhaps implemented in another application, and not shown, might identify other types or pieces of augmented data. As just one specific example, an application that is separate from the shown augmentation module 320 might itself perform some or all of the operations described previously with reference to FIG. 1 or FIG. 2, and in doing so might also identify and add augmented data to the clipboard. Such augmented data might co-exist with the augmented data identified and added by other modules, including the augmentation module 320.

In one example, the augmentation module 320 may be configured to receive copy data from a source application. The copy data (e.g., contact data of a personal information management application) may comprise a reference, such as a URL reference associated with an HTML social media website. The copy data may be placed into the clipboard. The supplemental data referred to by the reference may be retrieved (e.g., social media data, such as social media profile data and images, may be retrieved from the HTML social media website). The copy data within the clipboard may be augmented with the supplemental data (e.g., social media profile data may be stored with contact data within the clipboard).

Turning now to FIG. 4, shown therein is an exemplary system 400 that includes a graphical example of one mechanism for representing clipboard data, including a transfer representation of data. The exemplary system may contain clipboard data 410, structured data 420, feed data 450, and presentation data 480. Any or all of the structured data, feed data, and presentation data may include references in at least some implementations. Structured data may be associated with one or more structured data formats, such as structured data format 1 430 and structured data format N 432. A structured data format may contain one or more items, such as item 1 434 and item N 436. Feed data may be associated with feeds like feed 1 460 and feed N 462, while a feed may be associated with some number of sets of feed items, such as feed items 1 464 and feed items N 468. A set of feed items, like feed items 1 464, may be associated with some number of feed items, like feed item 1 466 and feed item N 467. Finally, presentation data 480 may be associated with one or more presentation formats, like presentation format 1 490 and presentation format N 492. This description of FIG. 4 may be made with reference to other figures. However, it should be understood that the elements described with reference to FIG. 4 are not intended to be limited to being used with the elements described with reference to other figures. In addition, while the exemplary diagram in FIG. 4 indicates particular elements, in some implementations not all of these elements may exist, and in some implementations additional elements may exist.

Clipboard data may be represented in a wide variety of formats. In some implementations, clipboard data may include some structured representation of the data itself (which may itself include references to additional data), feed or subscription information that may be associated with one or more references to additional data and about the structured data or about other data, and additional presentation or display representations of the structured data.

In some implementations, clipboard data, such as the clipboard data 410, may be represented using a markup language, like XML, for example, or some other representation. It should be noted that while the system 400 and the clipboard data 410 may be described herein with reference to XML elements, XML attributes, and so on, the use of XML is not required and any description of such use herein is provided for exemplary purposes only. The clipboard data may be represented in any number of a wide variety of alternate formats. Furthermore, while particular elements, attributes, and so on, may be referred to for exemplary purposes using a particular name, such elements, attributes, and so on, may be referred to using any name.

In some implementations, the clipboard data 410 may contain header information as well as one or more of different types of data, including the actual structured data, feed data, and presentation data. In general each of these types of data may refer to the same information, but in different formats. One purpose of providing multiple formats in this manner may be to make it more likely that a destination may find data appropriate for its use.

When represented using a markup language, perhaps like XML, the structure of the clipboard data 410 might be the same as or similar to the following:

| | |
|---|---|
| <liveclipboard> | |
| <lc:data> | 0 or 1 elements |
| <lc:format> | 1 or more elements |
| <lc:item/> | 1 or more elements |
| </lc:format> | |
| </lc:data> | |
| <lc:feeds> | 0 or 1 elements |
| <lc:feed> | 1 or more elements |
| <lc:feeditems> | 0 or 1 elements |
| <lc:feeditem> | 0 or more elements |
| </lc:feeditems> | |
| </lc:feed> | |
| </lc:feeds> | |
| <lc:presentations> | 0 or 1 elements |
| <lc:format/> | 1 or more elements |
| </lc:presentations> | |
| </liveclipboard> | |

In some implementations, the "liveclipboard" element may be associated with the clipboard data 410, and the "data", "feeds", and "presentations" elements, and their child elements, may be associated, respectively, with the structured data 420, feed data 450, and presentation data 480, and their child elements, as described with reference to FIG. 4. In addition, in this example data, the use of the string "lc:" might indicate a particular XML namespace, perhaps including a namespace related to transferring structured data using a clipboard as described herein.

In some cases, header or other information may be associated with the clipboard data 410. This data may be associated with some or all of "version", "source", and "description" attributes, as well as other attributes. The "version" attribute may represent the version of the clipboard data format used in a particular instance of the clipboard data. The "source" attribute may represent a reference, like a URL, to the source provider of the clipboard data content. And the "description" attribute may represent a human readable description of clipboard data content.

In some implementations, the clipboard data may be associated with at least one of structured data 420, feed data 450, and presentation data 480. In the same or other implementations, the clipboard data may be associated with more than one of these elements, including some implementations where all three of the elements, or possibly other elements, may be included.

The first set of data that may be included is the structured data itself, which, in some implementations, may be associated with the structured data 420. In the same or other implementations the structured data 420 may be associated with data represented using defined data formats, such as hCard and vCard for representing contact information, hCal and iCal for representing event information, and so on. However, any defined format or structured data may be used or associated with the structured data 420.

When the clipboard data 410 contains structured data 420, it may be represented, for example, in a manner similar to or the same as the following:

| | |
|---|---|
| <lc:data> | 0 or 1 elements |
| <lc:format> | 1 or more elements |
| <lc:item/> | 1 or more elements |
| </lc:format> | |
| </lc:data> | |

When represented like this, the "format" element may correspond to the structured data format 1 430 and the structured data format N 432, while the "item" element may correspond to the item 1 434 and the item N 436.

A structured data format, like structured data format 1 430, may define the format of the child "item" elements, like item 1 434 and item N 436, with which it is associated. A structured data format may be associated with some or all of the "contenttype", "type", and "encoding" attributes, as well as other attributes. The "contenttype" attribute may represent the content type of data for the contained "item" elements. For example, this attribute may contain data defined by the Internet Assigned Names Association (IANA), like "text/calendar", "application/xhtml+xml", and so on. The "type" attribute may represent a schema or format type of the data for the contained "item" elements. This may be useful, for example, if an IANA format identifier provided may not be sufficient to completely determine the type. For example, when the "contenttype" attribute has a value of "text/calendar" there may be sufficient information to determine that the data associated with an "item" element is formatted using the iCal standard. In contrast, when the "contenttype" attribute has a value such as "application/xhtml+xml", additional information may be necessary to determine the format of the data in the "item" element. For example, in this case, the "type" attribute might have a value of "vevent", which might indicate that the data is formatted using the hCal standard. Finally, an "encoding" attribute may represent how the data associated with the "item" elements is encoded.

In some implementations, when multiple formats are provided, such as with multiple instances of structured data format 1 430 and structured data format N 432, it may be useful to order the formats in some fashion. For example, "higher fidelity" formats—formats that may provide more data, for example—might be ordered before "lower fidelity" formats that do not provide as much data. (Lower fidelity formats may be more widely accepted by destinations, and so still may be preferable for some uses, or for some applications, web pages, and so on.)

After the format of the data is defined, for example, using a structured data format, like structured data format 1 430, one or more items that are represented using that format may be provided. These items may correspond, for example, to the item 1 434 and item N 436. In some representations, these items may be associated with "item" elements that are perhaps located as children of "data" and "format" elements.

An "item" may represent data itself and may be associated with some or all of "description" and "ref" attributes, as well as other attributes. The "description" attribute may represent additional data defined by the user or application. The "ref" attribute may contain a reference, for example a URL, associated with the item.

The "item" element may also contain data itself. For example, when using XML, if the data can be represented as well-formed XML data that uses, say, the UTF-8 encoding, then the XML corresponding to the data may be appended as a child of the "item" element. In some other cases, for example when the data may not be represented as well-formed UTF-8 XML data, the data may reside in a CDATA section for the "item" element, optionally encoded in the format described by the "encoding" attribute of the enclosing "format" element.

Data associated with either or both of the "format" and "item" elements may include both "by-value" and "by-reference" data. That is, the actual data itself may be included, for example, in the "item" element. Alternatively, or in addition to the actual data, a reference to the data or to additional data may be included. That is, an "item reference" may be included in the data for a structured data item. In some implementations, for example, the reference to the data may be stored using the previously introduced "ref" attribute. For example, in an item that contains information about a single contact or person, a by-value copy of the data might be provided as part of the "item" element itself, and a reference to that contact—perhaps as a URL—might be provided using the "ref" attribute of the "item" element. In some cases, for a particular item, only by-value data may be provided, while in other cases only by-reference data may be provided, and while in yet other cases, both by-value and by-reference data may be provided.

In some implementations, when there are multiple structured data formats, the ordering of items beneath each format may indicate how items correspond to each other. For example, if clipboard data 410 includes two structured data formats X and Y, corresponding in some implementations to two "format" elements, the first "item" element of format X may correspond to the first "item" element of format Y. That is, the first "item" element for each format may refer to the same item, but represented in different formats. Furthermore, in some implementations, when feed data—discussed in more detail below—exists, including feed data that includes feed items, the ordering of "item" elements may correspond to the ordering of "feeditem" elements, which may enable the correspondence of items to their location in a feed.

As just one example, suppose that the clipboard data includes contact information for a particular contact, and that the contact information itself is represented using the hCard standard. In such an example, the contact information itself may be represented as follows:

```
<div class='vcard'>
    <span class='fn n'>
        <span class='given-name'>John</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
```

A corresponding clipboard data representation might consist of the following data:

```
<?xml version="1.0" encoding="utf-8"?>
<liveclipboard version="0.92"
xmlns:lc="http://www.microsoft.com/schemas/liveclipboard">
    <lc:data>
        <lc:format type="vcard" contenttype="application/xhtml+xml">
            <lc:item>
                <div class='vcard'>
                    <span class='fn n'>
                        <span class='given-name'>John</span>
                        <span class='family-name'>Doe</span>
                    </span>
                    <div class='adr'>
                        <span class='type'>work</span> address:
                        <span class='street-address'>1 Microsoft Way</span>,
                        <span class='locality'>Redmond</span>,
                        <span class='region'>WA</span>
                        <span class='postal-code'> 98052</span>
                    </div>
                    <div class='tel'>
                        <span class='type'>work</span>
```

-continued

```
                <abbr class='type' title='voice'> phone: </abbr>
                <span class='value'>+1-978-555-1212</span>
            </div>
        </div>
    </lc:item>
   </lc:format>
  </lc:data>
</liveclipboard>
```

As another example, suppose that two contacts—each represented using hCard—are to be represented as clipboard data. The contacts themselves might be represented as follows:

```
<div class='vcard'>
    <span class='fn n'>
        <span class='given-name'>John</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
```

-continued

```
</div>
<div class='vcard'>
    <span class='fn n'>
        <span class='given-name'>George</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
```

And the corresponding clipboard data representation might be as follows:

```
<?xml version="1.0" encoding="utf-8"?>
<liveclipboard version="0.92"
xmlns:lc="http://www.microsoft.com/schemas/liveclipboard">
    <lc:data>
        <lc:format type="vcard" contenttype="application/xhtml+xml">
            <lc:item>
                <div class='vcard'>
                    <span class='fn n'>
                        <span class='given-name'>John</span>
                        <span class='family-name'>Doe</span>
                    </span>
                    <div class='adr'>
                        <span class='type'>work</span> address:
                        <span class='street-address'>1 Microsoft Way</span>,
                        <span class='locality'>Redmond</span>,
                        <span class='region'>WA</span>
                        <span class='postal-code'> 98052</span>
                    </div>
                    <div class='tel'>
                        <span class='type'>work</span>
                        <abbr class='type' title='voice'> phone: </abbr>
                        <span class='value'>+1-978-555-1212</span>
                    </div>
                </div>
            </lc:item>
            <lc:item>
                <div class='vcard'>
                    <span class='fn n'>
                        <span class='given-name'>George</span>
                        <span class='family-name'>Doe</span>
                    </span>
                    <div class='adr'>
                        <span class='type'>work</span> address:
                        <span class='street-address'>1 Microsoft Way</span>,
                        <span class='locality'>Redmond</span>,
                        <span class='region'>WA</span>
                        <span class='postal-code'> 98052</span>
                    </div>
                    <div class='tel'>
                        <span class='type'>work</span>
                        <abbr class='type' title='voice'> phone: </abbr>
```

```
                <span class='value'>+1-978-555-1212</span>
            </div>
        </div>
    </lc:item>
    </lc:format>
    </lc:data>
</liveclipboard>
```

As discussed previously, the clipboard data may include alternate representations or formats for a single item. As one example, suppose that an event may be represented using both the iCal and hCal standards. With such an example, the iCal data might be like the following:

```
BEGIN:VCALENDAR
METHOD:PUBLISH
VERSION:2.0
BEGIN:VEVENT
URL:http://www.microsoft.com/events/E1-001-000629872-2
DTSTART:20060208T180000
DTEND:20060208T180000
DTSTAMP:20060119T184157Z
SUMMARY:The Bellevue Vegetarian February Meetup
DESCRIPTION:Let's all get together and meet over a great veggie dinner at Teapot Vegetarian House in Redmond!
UID:E1-001-000629872-2
LOCATION:Bellevue\,Washington 98004
END:VEVENT
END:VCALENDAR
```

In the same example, the corresponding hCal data might be like the following:

```
<div class='vevent'>
    <a class='url' href='http://www.microsoft.com/events/E1-001-000629872-2'>
        <span class='summary'>The Bellevue Vegetarian February Meetup</span>
    </a>
    <div class='description'>Let's all get together and meet over a great veggie dinner at Teapot Vegetarian House in Redmond!</div>
    <div>Start Date: <abbr class='dtstart' title='20060208T180000'>February 8, 2006</abbr></div>
    <div>End Date: <abbr class='dtend' title='20060208T180000'>February 8, 2006</abbr></div>
    <div>Location: <span class='location'>Bellevue,Washington 98004</span></div>
    <div>UID: <span class='uid'>E1-001-000629872-2</span></div>
    <div>Last Updated: <abbr class='dtstamp' title='20060119T184157Z'>January 19, 2006</abbr></div>
</div>
```

Both of these formats might be represented in clipboard data in a manner similar to or the same as the following:

```
<?xml version="1.0" encoding="utf-8" ?>
<liveclipboard version="0.92"
xmlns:lc="http://www.microsoft.com/schemas/liveclipboard">
    <lc:data>
        <lc:format type="vcalendar" contenttype="application/xhtml+xml">
            <lc:item>
                <div class='vevent'>
                    <a class='url' href='http://www.microsoft.com/events/E1-001-000629872-2'>
                        <span class='summary'>The Bellevue Vegetarian February Meetup</span>
                    </a>
                    <div class='description'>Let's all get together and meet over a great veggie dinner at Teapot Vegetarian House in Redmond!</div>
                    <div>Start Date: <abbr class='dtstart' title='20060208T180000'>February 8, 2006</abbr></div>
                    <div>End Date: <abbr class='dtend' title='20060208T180000'>February 8, 2006</abbr></div>
                    <div>Location: <span class='location'>Bellevue,Washington 98004</span></div>
                    <div>UID: <span class='uid'>E1-001-000629872-2</span></div>
                    <div>Last Updated: <abbr class='dtstamp' title='20060119T184157Z'>January 19, 2006</abbr></div>
                </div>
            </lc:item>
        </lc:format>
        <lc:format contenttype="text/calendar">
            <lc:item>
```

```
        <![CDATA[
            BEGIN:VCALENDAR
            METHOD:PUBLISH
            VERSION:2.0
            BEGIN:VEVENT
            URL:http://www.microsoft.com/events/E1-001-000629872-2
            DTSTART:20060208T180000
            DTEND:20060208T180000
            DTSTAMP:20060119T184157Z
            SUMMARY:The Bellevue Vegetarian February Meetup
            DESCRIPTION:Let's all get together and meet over a great veggie dinner
at Teapot Vegetarian House in Redmond!
            UID:E1-001-000629872-2
            LOCATION:Bellevue\,Washington 98004
            END:VEVENT
            END:VCALENDAR
        ]]>
      </lc:item>
    </lc:format>
  </lc:data>
</liveclipboard>
```

Some clipboard data representations may be associated with subscription or feed information that may be, in some implementations, associated with the feed data 450. Such information may be useful, for example, to transfer references to data, to represent feeds of data, to enable subscriptions to data or feeds, and so on. In one example, item data may be provided using, for example, the structured data 420, and information about a feed that may be used to update the item data may be provided using the feed data 450. For example, an initial set of contacts might be provided using the structured data 420, and information in the feed data 450 may be provided to enable an application to later update the contacts initially provided using the structured data. In another example, the feed data may refer to some other data or information—that is, for example, the feed data may refer to data that is not transferred in the structured data 420. For example, the feed data may refer to one or more RSS ("Really Simple Syndication" or "Rich Site Summary"), Atom, or other feeds that contain additional or other information. The information referred to by the feed data may be related to or associated with the data included elsewhere in the transfer or clipboard data representation or may refer to data that is not included or associated with the transfer or clipboard data representation. Note also that references may be represented and communicated in other fashions that do not use feed references in feed data. For example, a reference might be represented as an item reference in a structured data item, as has been described previously.

Feed data may be represented in multiple ways, including, for example, in a manner similar to the following:

```
    <lc:feeds>           0 or 1 elements
        <lc:feed>        1 or more elements
            <lc:feeditems>      0 or 1 elements
                <lc:feeditem>   0 or more elements
            </lc:feeditems>
        </lc:feed/>
    </lc:feeds>
```

When represented like this, the "feeds" element may correspond to the feed data 450, the "feed" element may correspond to the feed 1 460 and feed N 462, the "feeditems" element may correspond to the feed items 1 464 and feed items N 468, and the "feeditem" element may correspond to the feed item 466 and feed item N 467.

A feed, like feed 1 460 and feed N 462, may have associated information about the feed. A feed may be associated with some or all of the "type", "ref", "description", and "authtype" attributes, as well as other attributes. The "type" attribute may represent the type of data that exists at the location specified, for example, by the "ref" attribute. For example, the "type" attribute may include values such as "RSS", "Atom", and so on, or other values. Generally, a wide variety of feed types may be used, depending upon, for example, the capabilities of the endpoints. For example, some implementations may support RSS, other implementations may support RSS and also support extensions to RSS to implement other functionality, and so on. For example, some endpoints may support "Simple Sharing Extensions" to enable bi-directional synchronization of data using RSS or other feed types. The "ref" attribute may represent a specific reference or address associated with the feed, like a URL. In some implementations, this reference may be the location of the feed itself. The "description" may represent some user-specified data associated with the feed. Finally, the "authtype" attribute may represent some type of authentication technique or techniques that may or must be used when accessing the feed.

Each feed may contain some number of sets of feed items, such as feed items 1 464 and feed items N 468. These may be represented in some cases by one or more "feeditems" elements. In turn, a set of feed items may contain some number of feed items, which might be represented using "feeditem" elements.

A set of feed items may be associated with the "contenttype", "type", and "xpath" attributes, as well as other attributes. The "contenttype" attribute may represent the content type of data for the contained "feeditem" elements. For example, similar to the structured data, this attribute may contain data defined by IANA, like "text/calendar", "application/xhtml+xml", and so on. The "type" attribute may represent a schema or format type of the data for the contained "feeditem" elements. This may be useful, like before and for example, if an IANA format identifier provided may not be sufficient to completely determine the type. For example, when the "contenttype" attribute has a value of "text/calendar" there may be sufficient information to determine that the data associated with a "feeditem" element is formatted using the iCalendar standard. In contrast, when the "contenttype" attribute has a value such as "application/xhtml+xml", additional information may be necessary to determine the format of the data in the "feed-item" element. For example, in this case, the "type" attribute might have a value of "vevent", which might indicate that the data is formatted using the hCal standard.

The "xpath" attribute may represent a query—perhaps using the XPath standard, but also represented using some other query language or standard—that returns or otherwise identifies data items from the feed. For example, if a feed is retrieved using the "ref" attribute of the parent "feed" element, in some cases the query represented by the "xpath" attribute may be executed against the contents of the retrieved feed to identify particular data items in the feed. This may enable the feed to contain a variety of data, only some of which may be relevant for or associated with the clipboard data, and still enable the clipboard data to be associated directly with the relevant data. In addition, this may enable the relevant portions of the data to be changed, perhaps at some later time, by only changing the value of this attribute; the actual data in the feed would not necessarily need to change. In implementations that do not use the "xpath" attribute, or a similar type of attribute or query, all of the data associated with the feed may be relevant to, for example, a subsequent update or data retrieval operation.

Similar to with the structured data discussed previously, in some implementations, when multiple formats are provided, it may be useful to order the formats in some fashion. For example, "higher fidelity" formats—formats that may provide more data, for example—might be ordered before "lower fidelity" formats that do not provide as much data. As before, lower fidelity formats may be more widely accepted, and so still may be preferable for some uses, or for some applications, web pages, and so on.

A set of feed items may in turn be associated with or contain some number of "feeditem" elements, which may in some cases, enable information retrieved from the feed to be linked to "item" elements provided, for example, in the structured data 420. A "feeditem" element may be associated with an "id" attribute, or some other attribute or data, which may represent some type of identifier, perhaps a unique identifier, for the feed item. In implementations that do not use or include elements like the "feeditem" element, data may still be retrieved and used, but in some cases the data may not be linked to the structured data also provided with the clipboard data.

In at least some implementations, if there are multiple instances of feeds, like feed 1 460 and feed N 462, the ordering of "feeditem" elements beneath each feed may indicate that particular items correspond to each other. For example, in the case where there are two "feed" elements named X and Y, the first "feeditem" element associated with "feed" X may correspond to the first "feeditem" element associated with "feed" Y. Also, in clipboard data that has structured data 420, the ordering of "feeditem" elements may correspond to the ordering of "item" elements provided in the structured data 420.

An example clipboard data representation that uses feed data 450 is provided below, after the discussion of presentation data.

Finally, some clipboard data representations may be associated with presentation data, such as presentation data 480 and presentation format 1 490 and presentation format N 492. Such data may provide a formatted or display representation of data that may also be provided elsewhere in the clipboard data. For example, where the structured data 420 includes a contact, perhaps in the hCard or vCard formats, the presentation data may be associated with an instance of the same contact data represented using HTML, JPEG, or some other presentation data format. In many cases destination applications, web pages, or the like, that do not understand data in one or more structured data formats may still understand a display representation, like HTML or JPEG, and so may still be able to at least display or present the clipboard data.

Presentation may be represented in multiple ways, including, for example, in a manner similar to the following:

| <lc:presentations> | 0 or 1 elements |
| <lc:format/> | 1 or more elements |
| </lc:presentations> | |

When represented like this, the "presentations" element may correspond to the presentation data 480, and the "format" element may correspond to the presentation format 1 490 and presentation format N 492.

The presentation data 480 may be associated with some number of presentation formats. Each presentation format, perhaps represented by a "format" element, may be associated with some or all of the "contenttype", "type", "encoding", "description", and "ref" attributes, as well as other attributes. The "contenttype" attribute may represent the content type of data, for example, for a CDATA section associated with this format. For example, this attribute may contain data defined by IANA, like "application/xhtml+xml", and the like. The "type" attribute may represent a schema or format type of the data for the format. Like before, this may be useful, for example, if an IANA format identifier provided may not be sufficient to completely determine the type. The "encoding" attribute may represent how the data associated with, for example, a CDATA section is encoded. The "description" attribute may represent data defined by the user or application. Finally, the "ref" attribute may contain a reference, for example a URL, associated with the item.

Similar to with structured data, a "format" element may also contain data itself. For example, when using XML, if the data can be represented as well-formed XML data that uses the UTF-8 encoding, then the XML corresponding to the data may be appended as a child of the "format" element. In some other cases, for example when the data may not be represented as well-formed UTF-8 XML data, the data may reside in a CDATA section for the "format" element, optionally encoded in the format described by the "encoding" attribute.

As just one example, suppose clipboard data is desired that represents contact information in the hCard format, an RSS feed associated with the contact information—so the contact information can be updated at some later point in time, for example—and an HTML representation of the contact data—perhaps useful, for example, if a destination of the clipboard data does not understand the hCard format.

With such an example, the hCard contact data might be represented as follows:

```
<div class='vcard'>
    <span class='fn n'>
        <span class='given-name'>John</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
```

-continued

```
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
<div class='vcard'>
    <span class='fn n'>
        <span class='given-name'>George</span>
        <span class='family-name'>Doe</span>
    </span>
    <div class='adr'>
```

-continued

```
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
```

In the same example, the RSS data might be represented as follows:

```
<?xml version="1.0" encoding="utf-8" ?>
<rss version="2.0">
  <channel>
    <title>My Friends </title>
    <link>http://localhost/FriendsFeed.ashx</link>
    <pubDate>Wed, 15 Mar 2006 09:05:43 –0800</pubDate>
    <lastBuildDate>Wed, 15 Mar 2006 09:05:43 –0800</lastBuildDate>
    <item>
        <title>John Doe</title>
        <description>
            <![CDATA[
                <div class='vcard'>
                    <span class='fn n'>
                        <span class='given-name'>John</span>
                        <span class='family-name'>Doe</span>
                    </span>
                    <div class='adr'>
                        <span class='type'>work</span> address:
                        <span class='street-address'>1 Microsoft Way</span>,
                        <span class='locality'>Redmond</span>,
                        <span class='region'>WA</span>
                        <span class='postal-code'>98052</span>
                    </div>
                    <div class='tel'>
                        <span class='type'>work</span>
                        <abbr class='type' title='voice'> phone: </abbr>
                        <span class='value'>+1-425-555-1212</span>
                    </div>
                </div>
            ]]>
        </description>
        <enclosure
url="http://server/SIS/contact.vcf?puid=1688852012477191&roid=4EB257647
8DA9846A06EFCC12FFC0185">
    </item>
    <item>
        <title>George Doe</title>
        <description>
            <![CDATA[
                <div class='vcard'>
                    <span class='fn n'>
                        <span class='given-name'>George</span>
                        <span class='family-name'>Doe</span>
                    </span>
                    <div class='adr'>
                        <span class='type'>work</span> address:
                        <span class='street-address'>1 Microsoft Way</span>,
                        <span class='locality'>Redmond</span>,
                        <span class='region'>WA</span>
                        <span class='postal-code'>98052</span>
                    </div>
                    <div class='tel'>
                        <span class='type'>work</span>
                        <abbr class='type' title='voice'> phone: </abbr>
                        <span class='value'>+1-425-555-1212</span>
                    </div>
                </div>
            ]]>
```

-continued

```
        </description>
        <enclosure url="
http://server/SIS/contact.vcf?puid=1688852012477191&roid=0B69B846ED7E
2241AE4F6773EA749183">
        </item>
    </channel>
</rss>
```

And in the same example, the HTML data for the contact information might be represented as follows:

```
<html>
    <body>
        <table>
            <tr>
                <th><b>Fullname</b></th>
                <th><b>Street Address</b></th>
                <th><b>City</b></th>
                <th><b>State</b></th>
                <th><b>Zip</b></th>
                <th><b>Phone</b></th>
            </tr>
            <tr>
                <td>John Doe</td>
                <td>1 Microsoft Way </td>
                <td>Redmond</td>
                <td>WA</td>
```

-continued

```
                <td>98052</td>
                <td>+1-425-555-1212</td>
            </tr>
            <tr>
                <td>George Doe</td>
                <td>1 Microsoft Way </td>
                <td>Redmond</td>
                <td>WA</td>
                <td>+1-425-555-1212</td>
            </tr>
        </table>
    </body>
</html>
```

Given all of these data representations, a corresponding clipboard data representation might consist of the following data:

```
<?xml version="1.0" encoding="utf-8" ?>
<liveclipboard version="0.92"
xmlns:lc="http://www.microsoft.com/schemas/liveclipboard">
<lc:data>
    <lc:format type="vcard" contenttype="application/xhtml+xml">
        <lc:item>
            <div class='vcard'>
                <span class='fn n'>
                    <span class='given-name'>John</span>
                    <span class='family-name'>Doe</span>
                </span>
                <div class='adr'>
                    <span class='type'>work</span> address:
                    <span class='street-address'>1 Microsoft Way</span>,
                    <span class='locality'>Redmond</span>,
                    <span class='region'>WA</span>
                    <span class='postal-code'> 98052</span>
                </div>
                <div class='tel'>
                    <span class='type'>work</span>
                    <abbr class='type' title='voice'> phone: </abbr>
                    <span class='value'>+1-978-555-1212</span>
                </div>
            </div>
        </lc:item>
        <lc:item>
            <div class='vcard'>
                <span class='fn n'>
                    <span class='given-name'>George</span>
                    <span class='family-name'>Doe</span>
                </span>
                <div class='adr'>
                    <span class='type'>work</span> address:
                    <span class='street-address'>1 Microsoft Way</span>,
                    <span class='locality'>Redmond</span>,
                    <span class='region'>WA</span>
                    <span class='postal-code'> 98052</span>
                </div>
                <div class='tel'>
                    <span class='type'>work</span>
                    <abbr class='type' title='voice'> phone: </abbr>
                    <span class='value'>+1-978-555-1212</span>
                </div>
            </div>
        </lc:item>
```

```
                </lc:format>
            </lc:data>
            <lc:feeds>
                <lc:feed type="RSS" ref="http://localhost/FriendsFeed.ashx" description="My
Friends" authtype="none">
                    <lc:feeditems type="vcard" contenttype="application/xhtml+xml"
xpath="/rss/channel/item/description">
                        <lc:feeditem
id="http://server/SIS/contact.vcf?puid=1688852012477191&roid=4EB257
6478DA9846A06EFCC12FFC0185">
                        <lc:feeditem
id="http://server/SIS/contact.vcf?puid=1688852012477191&roid=0B69B8
46ED7E2241AE4F6773EA749183">
                    </lc:feeditems>
                </lc:feed>
            </lc:feeds>
            <lc:presentations>
                <lc:format contenttype="text/html">
                    <table>
                        <tr>
                            <th>Fullname</th>
                            <th>Street Address</th>
                            <th>City</th>
                            <th>State</th>
                            <th>Zip</th>
                            <th>Phone</th>
                        </tr>
                        <tr>
                            <td>John Doe</td>
                            <td>1 Microsoft Way </td>
                            <td>Redmond</td>
                            <td>WA</td>
                            <td>+1-425-555-1212</td>
                        </tr>
                        <tr>
                            <td>George Doe</td>
                            <td>1 Microsoft Way </td>
                            <td>Redmond</td>
                            <td>WA</td>
                            <td>+1-425-555-1212</td>
                        </tr>
                    </table>
                </lc:format>
            </lc:presentations>
</liveclipboard>
```

Example Computing Environment

Figure 5:
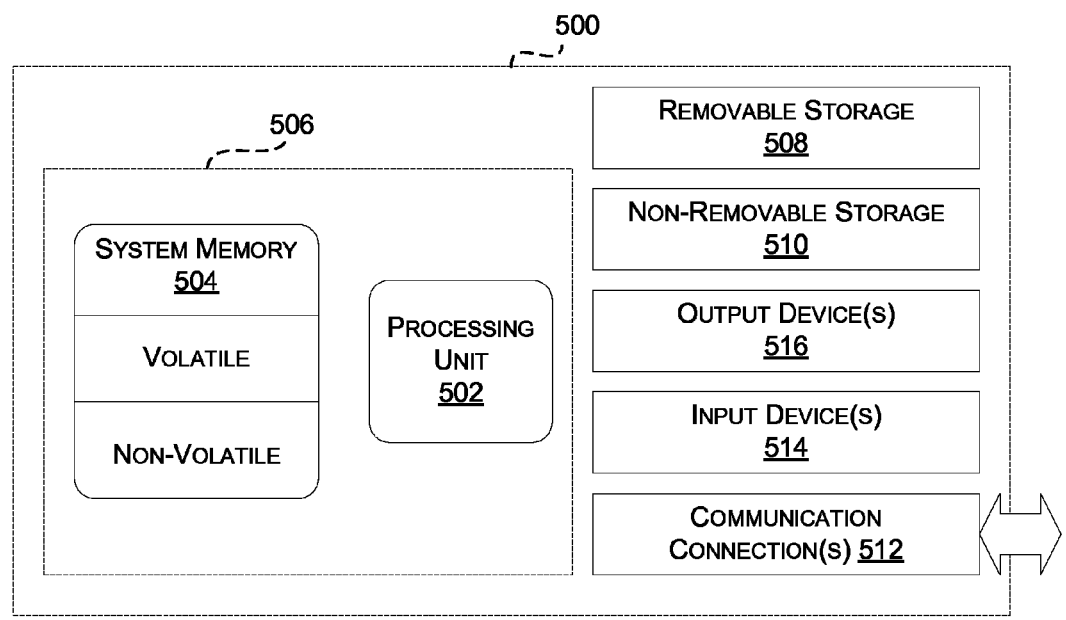
FIG. 5 illustrates an exemplary computer device in which the various technologies described herein may be implemented.

Turning now to FIG. 5, this figure and the related discussion are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 500 illustrated in FIG. 5.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 500 illustrated in FIG. 5, in its most basic configuration, includes at least one processing unit 502 and memory 504. In some implementations, the computing device 500 may implement all or part of, for example, the computer system 310, described previously with reference to FIG. 3. In some implementations, the processing unit 502 may be a general purpose central processing unit (CPU), as exists, for example, on a variety of computers, including desktop and laptop computers. Depending on the exact configuration and type of computing device, the memory 504 may be volatile (such as RAM), non-volatile (such as ROM, flash memory, etc.), or some combination of the two.

This most basic configuration is illustrated in FIG. 5 by dashed line 506. Additionally, the computing device 500 may also have additional features and functionality. For example, the computing device 500 may also include additional storage (removable and/or non-removable) including, but not limited to, magnetic or optical disks or tape. Such additional storage is illustrated in FIG. 5 by the removable storage 508 and the non-removable storage 510.

The computing device 500 may also contain one or more communications connection(s) 512 that allow the computing device 500 to communicate with other devices and services. The computing device 500 may also have one or more input device(s) 514 such as an image input devices like cameras or scanners, keyboards, mice, pens, voice input devices including microphone arrays, touch input devices, and so on. One or more output device(s) 516 such as a display, speakers, printer, and so on, may also be included in the computing device 500.

Those skilled in the art will appreciate that the technologies described herein may be practiced with computing devices other than the computing device 500 illustrated in FIG. 5. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 5, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A system comprising:
   at least one processing unit; and
   at least one memory comprising:
      a clipboard for enabling information exchange between a first application and a second application,
      a first set of instructions that when executed by the at least one processing unit perform a copy method comprising:
         in response to a copy operation initiated by a user while using the first application,
            (1) generating structured clipboard data comprising a content type attribute representing a type of at least one data item, a uniform resource attribute containing a reference to a location of the at least one data item, wherein the location of the at least one data item refers to a location external to the system, and activity data specifying at least one function associated with the at least one data item, and
            (2) storing the structured clipboard data in the clipboard; and
      a second set of instructions that when executed by the at least one processing unit perform a paste method comprising:
         in response to a paste operation initiated by the user while using the second application, processing the structured clipboard data in the clipboard, including:
            (1) determining the type of the at least one data item based on any content type attribute representing the type of the at least one data item, and
            (2) executing the paste operation by retrieving the at least one data item based on the uniform resource attribute containing the reference to the location after executing the at least one function based on the activity data associated with the at least one data item.

2. The system of claim 1, wherein the executing the at least one function based on the activity data associated with the at least one data item comprises delaying retrieval of the at least one data item.

3. The system of claim 1, wherein the structured clipboard data further comprises an identifier attribute for identifying the at least one data item.

4. The system of claim 1, wherein the reference to the location comprises a uniform resource locator.

5. The system of claim 1, wherein the at least one memory further comprises a third set of instructions that when executed by the at least one processing unit perform a method comprising permitting an application to register to be notified of an event.

6. The system of claim 1, wherein the at least one memory further comprises a fourth set of instructions that when executed by the at least one processing unit perform a method comprising implementing an application programming interface.

7. The system of claim 6, wherein the at least one memory further comprises a fifth set of instructions that when executed by the at least one processing unit perform a method enabling execution of the fifth set of instructions, via the application programming interface, in response to the executing the at least one function.

8. A method in a system comprising at least one processing unit and at least one memory comprising a clipboard for enabling information exchange between a first application and a second application, the method comprising:
   in response to a copy operation initiated by a user while using the first application,
      (1) using the at least one processing unit, generating structured clipboard data comprising a content type attribute representing a type of at least one data item, a uniform resource attribute containing a reference to a location of the at least one data item, wherein the location of the at least one data item refers to a location external to the system, and activity data specifying at least one function associated with the at least one data item, and
      (2) using the at least one processing unit, storing the structured clipboard data in the clipboard; and
   in response to a paste operation initiated by the user while using the second application, processing the structured clipboard data in the clipboard, including:

(1) using the at least one processing unit, determining the type of the at least one data item based on any content type attribute representing the type of the at least one data item, and (2) using the at least one processing unit, executing the paste operation by retrieving the at least one data item based on the uniform resource attribute containing the reference to the location after executing the at least one function based on the activity data associated with the at least one data item.

9. The method of claim 8, wherein the executing the at least one function based on the activity data associated with the at least one data item comprises delaying retrieval of the at least one data item.

10. The method of claim 8, wherein the structured clipboard data further comprises an identifier attribute for identifying the at least one data item.

11. The method of claim 8, wherein the reference to the location comprises a uniform resource locator.

12. The method of claim 8 further comprising permitting an application to register to be notified of an event.

13. The method of claim 8 further comprising providing an application programming interface for enabling the copy operation and the paste operation.

14. The method of claim 8 enabling execution of a second method, via the application programming interface, in response to the executing the at least one function.

15. A computer readable storage device comprising computer executable instructions that when executed by at least one processing unit perform a method for enabling information exchange between a first application and a second application via a clipboard, comprising:
  in response to a copy operation initiated by a user while using the first application,
    (1) using the at least one processing unit, generating structured clipboard data comprising a content type attribute representing a type of at least one data item, a uniform resource attribute containing a reference to a location of the at least one data item, wherein the location of the at least one data item refers to a location external to the system, and activity data specifying at least one function associated with the at least one data item, and
    (2) using the at least one processing unit, storing the structured clipboard data in the clipboard; and
  in response to a paste operation initiated by the user while using the second application, processing the structured clipboard data in the clipboard, including:
    (1) using the at least one processing unit, determining the type of the at least one data item based on any content type attribute representing the type of the at least one data item, and
    (2) using the at least one processing unit, executing the paste operation by retrieving the at least one data item based on the uniform resource attribute containing the reference to the location after executing the at least one function based on the activity data associated with the at least one data item.

16. The computer readable storage device of claim 15, wherein the executing the at least one function based on the activity data associated with the at least one data item comprises delaying retrieval of the at least one data item.

17. The computer readable storage device of claim 15, wherein the structured clipboard data further comprises an identifier attribute for identifying the at least one data item.

18. The computer readable storage device of claim 15, wherein the reference to the location comprises a uniform resource locator.

19. The computer readable storage device of claim 15 further comprising computer executable instructions that when executed by at least one processing unit permit an application to register to be notified of an event.

20. The computer readable storage device of claim 15 further comprising computer executable instructions that when executed by at least one processing unit provide an application programming interface for enabling the copy operation and the paste operation.

* * * * *